United States Patent
Ma et al.

(10) Patent No.: US 10,869,179 B1
(45) Date of Patent: Dec. 15, 2020

(54) SYSTEMS, METHODS AND TECHNIQUES FOR INTEROPERABLE EMERGENCY COMMUNICATION

(71) Applicant: CRISISGO, Inc., Saint Louis, MO (US)

(72) Inventors: Songwei Ma, Saint Louis, MO (US); James Francis Spicuzza, Saint Louis, MO (US)

(73) Assignee: CRISISGO, INC., Saint Louis, MO (US)

(*) Notice: Subject to any disclaimer, the term of this patent is extended or adjusted under 35 U.S.C. 154(b) by 0 days.

(21) Appl. No.: 16/578,683

(22) Filed: Sep. 23, 2019

(51) Int. Cl.
| | |
|---|---|
| *H04W 4/90* | (2018.01) |
| *H04W 68/00* | (2009.01) |
| *H04W 4/02* | (2018.01) |
| *H04W 4/021* | (2018.01) |
| *H04W 4/08* | (2009.01) |

(52) U.S. Cl.
CPC ............ *H04W 4/90* (2018.02); *H04W 4/021* (2013.01); *H04W 4/023* (2013.01); *H04W 4/08* (2013.01); *H04W 68/005* (2013.01)

(58) Field of Classification Search
CPC ....... H04W 4/90; H04W 4/021; H04W 4/023; H04W 4/08; H04W 68/005
USPC ...................................................... 455/404.1
See application file for complete search history.

(56) References Cited

U.S. PATENT DOCUMENTS

| | | | |
|---|---|---|---|
| 9,848,313 B1* | 12/2017 | Cottle | H04W 4/90 |
| 2014/0230030 A1* | 8/2014 | Abhyanker | G06F 16/9537 726/6 |
| 2015/0317809 A1* | 11/2015 | Chellappan | H04W 4/029 455/404.1 |
| 2015/0358794 A1* | 12/2015 | Nokhoudian | H04W 4/90 455/404.1 |
| 2016/0050037 A1* | 2/2016 | Webb | G08B 27/005 455/3.01 |
| 2016/0119424 A1* | 4/2016 | Kane | H04L 67/1097 709/203 |
| 2017/0191843 A1* | 7/2017 | Yadav | G01C 21/3407 |
| 2017/0230786 A1* | 8/2017 | Ramamurthy | H04W 4/024 |
| 2018/0098206 A1* | 4/2018 | Nguyen | H04L 51/20 |
| 2019/0082312 A1* | 3/2019 | Neybert | H04W 4/21 |
| 2020/0077250 A1* | 3/2020 | Gideon, III | H04W 4/029 |

* cited by examiner

*Primary Examiner* — Mong-Thuy T Tran
(74) *Attorney, Agent, or Firm* — Nixon & Vanderhye P.C.

(57) ABSTRACT

An emergency communication server is provided for collaboration of an emergency response. The server comprises a processing system including a processor. The processing system is configured to receive an input from an electronic device, the electronic device being operated by a member from an originating communication group, upon receipt of the input from the electronic device, generate a notification based on the received input and send the generated notification to at least one member in the originating communication group, determine one or more receiving communication groups for the received input, send the notification to at least one member in each of the determined one or more receiving communication groups, and enable the at least one member in each of the determined one or more receiving communication groups to communicate with one or more members of the originating communication group.

22 Claims, 25 Drawing Sheets

Staff

Policeman

Alert Escalation - Staff

Alert Escalation – Law enforcement

Panic Escalation - Staff

Panic Escalation – Law Enforcement

Select school staff groups for broadcasting an alert

SYSTEMS, METHODS AND TECHNIQUES FOR INTEROPERABLE EMERGENCY COMMUNICATION

FIELD OF THE DISCLOSURE

Certain example embodiments disclosed herein relate generally to emergency communication systems and methods, and more particularly, to intra-organization and cross-organization emergency communication for collaboration of an emergency response on a special event.

BACKGROUND AND SUMMARY

Emergency communication plays an important role when an emergency situation occurs in an organization or at an event. During an emergency situation, relevant people need to be informed instantly and kept connected, e.g., to be updated of latest status and to be kept in coordination with others for a rapid emergency response.

For some critical events, people from other organizations may also need to get involved in emergency response processes. For example, for a fire or active shooter event, first responders from a fire department may need to get involved in the event immediately. Therefore, information about an emergency event may need to be delivered to multiple organizations and emergency responses of those organizations may need to be triggered. For example, if there is an active shooter event at a site, a law enforcement officer needs to not only inform people at the site, but also inform organizations around the site immediately to avoid more casualties. In some situations, first responders or other organizations may not only need to be immediately notified, but also need to be able to communicate with people on site during and after the situation.

Example interoperable emergency communication systems disclosed herein provide tools allowing relevant people to be instantly notified of an event or situation and to stay connected during and after the event or situation. The technique disclosed herein provides emergency communication systems and methods for enabling intra-organization emergency communication for an intra-organization emergency response and enabling cross-organization emergency communication for collaboration of emergency responses among different organizations. An example emergency communication system may coordinate alerts, messages and notifications through communication across and within first responders, school safety and security teams, teachers, staff members and/or an entire community.

In particular, a non-limiting, exemplary interoperable emergency communication system may comprise at least three parts as below:
  Intra-organization emergency communication;
  Emergency communication escalation; and
  Emergency communication broadcasting.

According to one aspect of the present technology, there is provided an emergency communication server for collaboration of an emergency response. The emergency communication server comprises at least one transceiver configured to transmit and receive data from a plurality of electronic devices, a storage storing information about a plurality of communication groups, each of the communication groups having a plurality of members, and a processing system including a processor. The processing system is configured to receive an input from an electronic device via the at least transceiver, the electronic device is operated by a member from an originating communication group. The originating communication group is one of the plurality of communication groups. The processing system is further configured to, upon receipt of the input from the electronic device, generate a notification based on the received input and send the generated notification to at least one member in the originating communication group, determine one or more receiving communication groups from the plurality of communication groups for the received input, send the generated notification to at least one member in each of the determined one or more receiving communication groups via the at least transceiver, and enable the at least one member in each of the determined one or more receiving communication groups to communicate with one or more members of the originating communication group.

In an example embodiment, the input from the electronic device specifies an emergency event type, and the one or more receiving communication groups is determined based on the emergency event type.

In another example embodiment, the plurality of members in each of the communication groups are assigned with one or more roles. For example, the one or more roles comprise a normal member, and/or a manager of the originating communication group.

In some example embodiments, the generated notification is an alert, a panic message or an incident report. In certain example embodiments, the generated notification is sent to all members or only members of one or more particular roles in each of the one or more receiving communication groups. In an example, the generated notification is an alert, and the alert is sent to all members in each of the one or more receiving communication groups. In another example, the generated notification is a panic message, and the panic message is sent to only managers in each of the one or more receiving communication groups.

It is provided that the processing system of the emergency communication server in one example is further configured to add the at least one member in each of the determined one or more receiving communication groups into the originating communication group.

In an example, the at least one member added into the originating communication group is assigned with one or more roles. In some examples, the processing system is further configured to enable members in the originating communication group to communicate with each other and/or send a message to members with specific role(s) in the originating communication group.

In another example, the at least one member is added into the originating communication group based on a predefined escalation option and/or a predefined geofencing option. For example, the predefined escalation options may specify one or more members from the one or more receiving communication groups to be added into the originating communication group, and/or one or more roles to be assigned to the one or more members to be added into the originating communication group. On the other hand, in an example, the predefined geofencing option may specify a geofencing list and/or a geofencing distance requirement. For example, the geofencing distance requirement specifies a maximum distance between a current location of a member in the geofencing list and a location of the electronic device transmitting the input. In an example, a member from the receiving communication group may be added into the originating communication group based on both the predefined escalation option and the predefined geofencing option, and the member is added into the originating communication group if the member is located within the maximum distance specified by the geofencing distance requirement or the member is not listed in the geofencing escalation list.

In certain example embodiments, information regarding the generated notification is shown on a screen of an electronic device operated by a member in one of the receiving communication groups. For example, the information regarding the generated notification may be shown on the screen of the electronic device together with an output of audible tone.

It is also provided that the processing system of the emergency communication server may be further configured to synchronize the plurality of communication groups in the storage with information provided by an external system in accordance with one or more predetermined synchronization rules. For example, the external system may be an enrollment system or a human resource information system. In one example, the information provided by the external system comprises characteristics of members of an organization. In another example, the plurality of communication groups is automatically synchronized with the information provided by the external system periodically. Alternatively, in an example, the information about the plurality of communication groups is synchronized with the information provided by the external system upon detecting that a particular event occurred in the external system. For example, the particular event is adding, removing or updating a person in the external system.

One example of the present technology is directed to a method of controlling a server including a processing system. The method comprises receiving an input from an electronic device. The electronic device may be operated by a member from an originating communication group. The method further comprises, upon receipt of the input from the electronic device, generating a notification based on the received input and sending the generated notification to at least one member in the originating communication group, determining one or more receiving communication groups for the received input, sending the generated notification to at least one member in each of the determined one or more receiving communication groups, and enabling the at least one member in each of the determined one or more receiving communication groups to communicate with one or more members of the originating communication group.

According to another aspect of the present technology, there is provided an emergency communication system for collaboration of an emergency response. The system comprises the emergency communication server as described above and an electronic device. The electronic device includes a processor configured to generate a user interface enabling a user to input data, a transmitter configured to transmit inputs to the server, the inputs being generated based on the data input by the user, and a receiver configured to receive a message or notification from the server.

Some examples are directed to a non-transitory computer-readable storage medium having stored therein an information processing program for execution by a device comprising a processing system including a processor. The information processing program comprises instructions that, when executed by the processing system, causing the device to perform operations including receiving an input from an electronic device. The electronic device may be operated by a member from an originating communication group. The information processing program further comprises instructions that, when executed by the processing system, causing the device to perform operations including, upon receipt of the input from the electronic device, generating a notification based on the received input and sending the generated notification to at least one member in the originating communication group, determining one or more receiving communication groups for the received input, sending the generated notification to at least one member in each of the determined one or more receiving communication groups, and enabling the at least one member in each of the determined one or more receiving communication groups to communicate with one or more members of the originating communication group.

The exemplary embodiments, aspects, and advantages disclosed herein may be provided in any suitable combination or sub-combination to achieve yet further exemplary embodiments.

BRIEF DESCRIPTION OF THE DRAWINGS

The accompanying drawings facilitate an understanding of the various preferred embodiments of this invention. In such drawings:

FIG. 7A-1 illustrates a non-limiting, exemplary user interface enabling a staff member to generate a message reporting a panic according to one or more example embodiments.

FIG. 7A-2 illustrates a non-limiting, exemplary user interface enabling a staff member to generate a message reporting a panic according to one or more example embodiments.

DETAILED DESCRIPTION OF EXEMPLARY EMBODIMENTS

In accordance with certain exemplary embodiments, certain systems, devices, processes and methods are disclosed for an interoperable emergency communication system, more particularly, certain exemplary embodiments related to intra-organization and cross-organization emergency communication for collaboration of emergency responses on special events are described herein. In the following description, for purpose of explanation, numerous specific details are set forth to provide a thorough understanding of the exemplary embodiments. It will be evident, however, to a person skilled in the art that the exemplary embodiments may be practiced without these specific details.

Figure 1:
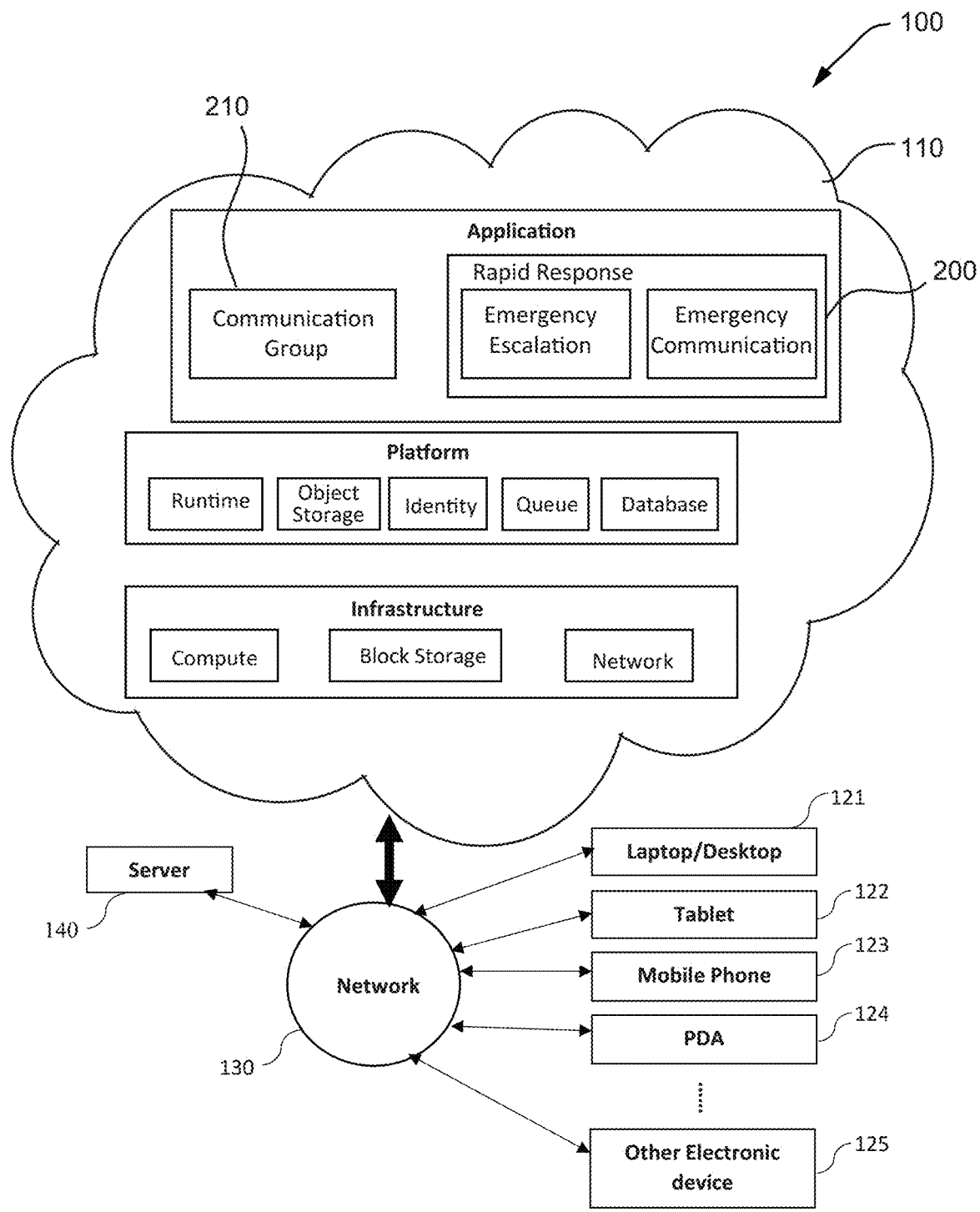
FIG. 1 shows a non-limiting, exemplary system architecture of an exemplary emergency communication platform according to one or more example embodiments.

FIG. 1 illustrates a non-limiting, exemplary system architecture 100 of an example interoperable emergency communication system. Some example embodiments may have different and/or other sub-modules than the ones described herein. Similarly, the functions can be distributed among the sub-modules in accordance with other embodiments in a different manner than is described herein.

The system architecture 100 includes a cloud platform 110, a server 140 based on the cloud platform 110, and a network 130. The server 140, in one example embodiment, may be part of the cloud platform 110. In another example embodiment, the server 140 may be separate from the cloud platform 110.

FIG. 1 illustrates the general structure of the cloud platform 110. The cloud platform 110 provides various services related to infrastructure, platform and application respectively. For example, services on the infrastructure level provide high-level APIs used to dereference various low-level details of underlying network infrastructure like physical computing resources, location, data partitioning, scaling, security, backup etc., and services provided on the platform level may be related to an operating system, a programming-language execution environment, a database, a web server, and so on.

In an example embodiment, the interoperable emergency communication system 100 includes applications run on the cloud platform 110, such as, Rapid Response module 200 including Emergency Communication and Emergency Escalation features, and Communication Group Management Module 210 for maintaining and synchronizing communication groups defined in the system. Details of these applications are further discussed below in connection with FIG. 2.

Users may access services or applications run on the cloud platform 110 via various kinds of electronic devices. Supported user devices may be PCs. Macs, iPhones, Android Phones, tablets, iPads, and Chromebooks, etc. In certain example embodiments, a plurality of electronics devices 121-125 are, respectively, a laptop or desktop 121, a tablet 122, a mobile phone 123, a PDA 124, and other electronic device 125, though it will be appreciated that other properly configured devices may be used.

The server 140 and/or the plurality of electronics devices 121-125 connect with the cloud platform 110 via the network 130. Examples of the network 130 may include a Local Area Network (LAN), a wide area network, and/or a global network, such as Internet, etc. It will be appreciated that the electronics devices 121-125 may communicate with the server 140 and/or the cloud platform 110 via any suitable communications means, such as satellite communications, radio communications, telephone communications, cellular communications, internet communications, or other means.

Figure 2:
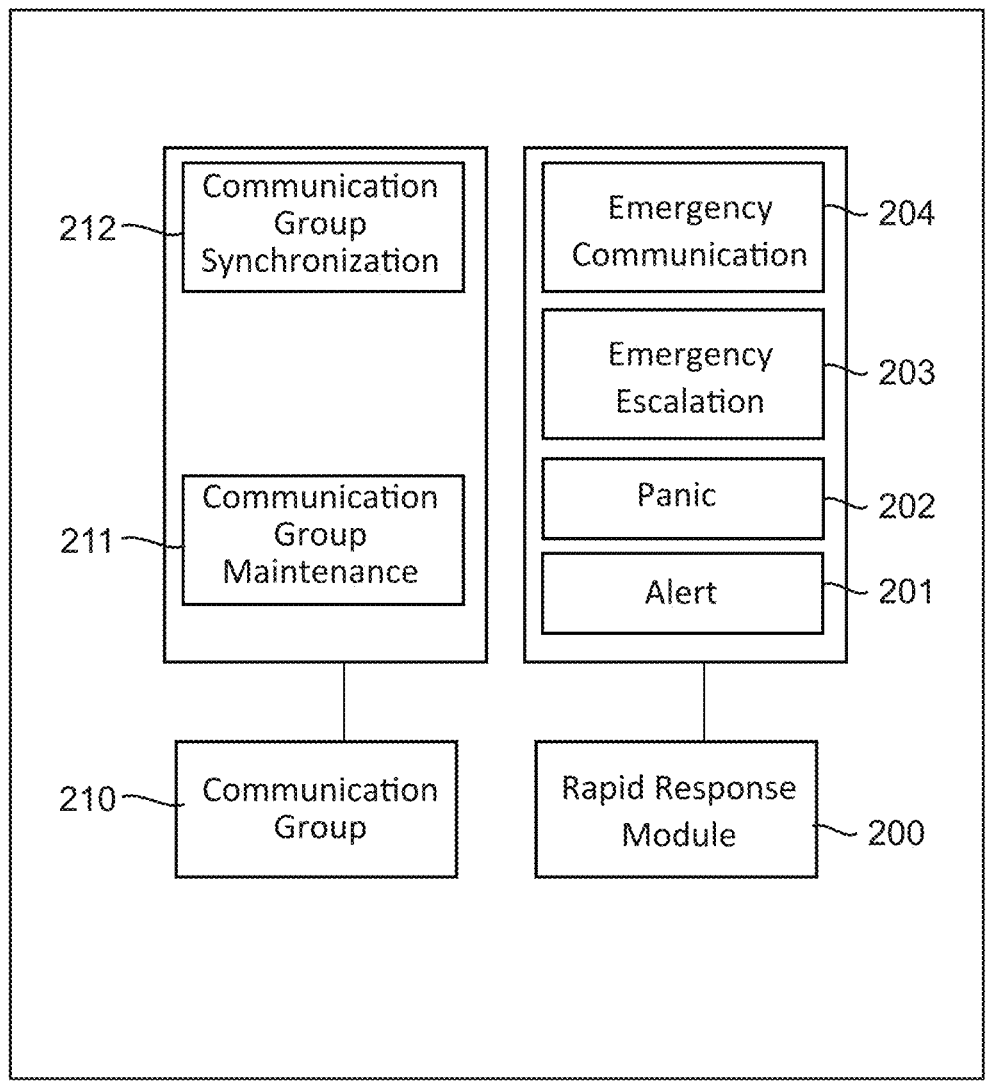
FIG. 2 illustrates non-limiting, exemplary functional modules provided by an exemplary interoperable emergency communication system according to one or more example embodiments.

FIG. 2 illustrates non-limiting, exemplary functional modules and features provided by an example interoperable emergency communication system. Some example embodiments may have different and/or other sub-modules than the ones described herein. Similarly, the functions can be distributed among the sub-modules in accordance with other embodiments in a different manner than is described herein.

As shown in FIG. 2, the interoperable emergency communication system comprises a Rapid Response Module 200 and a Communication Group Management Module 210.

The Rapid Response Module 200 provides various services and features, such as Alert 201, Panic 202, Emergency Escalation 203, and Emergency Communication 204. The Rapid Response Module 200 enables emergency communication for an intra-organization emergency response and cross-organization emergency communication for collaboration of emergency responses among different organizations.

In certain example embodiments, the Alert 201 may allow a user to inform everyone associated with an organization and/or event with a mass-notification. In an example embodiment, the mass-notification may include an audible tone for a distinct notification. In other example embodiments, an alert may spur an immediate action (e.g., automatically dialing 911 or locking doors) and include descriptive messaging capabilities for all members of an organization.

In an example embodiment, during an isolated incident, the Panic 202 may allow a user to directly request for immediate help from the security team of an organization without alerting the entire organization.

The Emergency Escalation 203 allows automatically escalating specific alerts, panics, and incident reports to first responders to ensure that relevant people can be part of the team to solve the issues. The escalation of an emergency event may be configured or customized by a system administrator. The system administrator may configure a particular kind of alerts, panics and/or incident reports will be escalated to a particular group of people, for example, alerts about any active shooter event may need to be escalated to law enforcement officers around the site where an active shooter event occurs.

The Emergency Communication 204 may ensure that people within an organization or cross organizations will never lose communication during a crisis with two-way communication groups that allow vital information to reach people in need timely. In an example embodiment, the Emergency Communication 204 also allows a user to broadcast alerts and incident reports to all of the relevant people.

The Communication Group Management Module 210 enables users to manage communication groups stored on the cloud platform 110. In an example embodiment, the Communication Group Management Module 210 includes sub-modules like Communication Group Maintenance 211 and Communication Group Synchronization 212. The Communication Group Maintenance 211 manages a plurality of communication groups, each of which includes member(s) from particular organization(s), departments, team(s) or people of particular role(s) and duties. The Communication Group Synchronization 212 enables the synchronization of data related to defined communication groups between the interoperable emergency communication system and an external system, e.g., an Enrollment System for teachers, students, and/or staff members, or an Enterprise Resource Planning System (ERPs), etc.

In the remaining sections of the disclosure, further details of each of the modules and features illustrated in FIG. 2 are described.

I. Communication Group Maintenance and Synchronization

Within an organization, different emergency situations may require getting different group(s) of people involved for an emergency response. Some situations may require involving everyone in the organization, while other situations may require involving a management team in the organization. Thus, one or more communication groups may be defined for an organization to address differmnt needs of various situations. An example emergency communication group can include two or more people, one or more departments/teams, or everyone in the organizations based on the particular needs of the emergency communication group.

Members of a communication group may have different roles, for example, one or more of the members may be manager(s) of the communication group, and the other members may be normal members of the communication group. Members of different roles may have different rights. For example, a manager of a communication group may be able to access or receive all of the messages forwarded to the group, while a normal member of the group may only be able to access messages specifically sent to him/her or everyone in the group. In an example embodiment, a principal of a high school may be a manager of a communication group established for staff members of the school, and staff members of the high school may be normal members of the communication group. In some example embodiments, the roles of members may be customized by an administrator, and particular rights for different roles may also be customized by the administrator.

Figure 3:
FIG. 3 illustrates a non-limiting, exemplary user interface showing a plurality of communication groups according to one or more example embodiments.

FIG. 3 illustrates a non-limiting, exemplary user interface showing a plurality of communication groups associated with a user of an interoperable emergency communication system. As shown in the figure, in the embodiment, the user may be a principal of Frazier High School (FHS) in city of Chicago, and the communication groups maintained for the user include Chicago Public District, FHS-Parents, FHS-Staff, and FHS-Students. Via the interoperable emergency communication system, the user is allowed to communicate with one or more people from any of these communication groups. For example, the principal may send alert notifications, and/or incident reports to relevant people from any of these communication groups, and receive alert notifications, incident reports, and panic messages from any other person from these communication groups as well. In an example embodiment, a user is allowed to create as many emergency communication groups as the user likes.

In an example embodiment, each communication group may be associated with particular type(s) of emergency event(s). Based on emergency types associated with each communication group, the type of an emergency situation may determine the relevant communication groups to which a notification regarding the emergency situation will be sent. For example, if the emergency event is an active shooter in a high school, an alert may be sent to a communication group for local law enforcement and other communication groups of the high school, such as communication groups for staff members and students in the high school. In another example, if the emergency event is a fire in a building, an emergency message regarding the fire may be sent to a communication group for a local fire department and communication groups for all of the teams in the building.

In some example embodiments, one emergency communication group may be associated with multiple emergency types, e.g., a communication group for a medical emergency team in a local district may be associated to different events occurred in the district, such as an active shooter, a bomb threat and/or a medical emergency, etc.

In another example embodiment, an administrator and/or manager(s) of an emergency communication group may be allowed to configure the event types associated with the group to control messages to be received by members in the group. Thus, administrator(s) and/or manager(s) of some large district may configure their communication group to ensure that they will not be inundated with a large amount of messages, but only received those events that they immediately needed to be aware of.

When an emergency situation occurs, a notification or information about the emergency situation may be sent to at least some of the relevant people in different communication groups based on the configurations of these communication groups. For example, some emergency event notifications may be sent to every members in an emergency communication group, while other emergency event notifications may be sent to some of the members of the emergency communication group (e.g., managers) based on different roles of people in the group.

In certain example embodiments, upon receipt of emergency event information, people can take appropriate actions based on a provided emergency response plan and emergency response resources (e.g. a contact list, an evacuation map, etc.). In addition, if a two-way communication is enabled in a communication group, members in the group may also be able to communicate with each other in the emergency communication group.

It is important to maintain each emergency communication group with appropriate members in order to react to emergency types associated with the group appropriately. An administrator or manager may manually manage an emergency communication group, e.g., adding new members, removing existing members, or updating properties (including their roles) of members, etc. Automatically synchronizing members in communication groups with an external human resource management system may reduce maintenance effort. Automatic synchronization rules may be defined for each emergency communication group for automatically updating the group, for example, using information extracted from an enrollment system of an org. Based on roles/departments and other information provided in the enrollment data of an organization, e.g. staff enrollment, student enrollment, parent lists, citizens list, customer list, etc., people can be automatically added into or removed from different emergency communication groups. In an example embodiment, a person may also be automatically assigned to be a normal member or a manager of one or more emergency communication groups based on his/her role(s) in an organization, e.g., a teacher, a student or a principal, etc.

In certain example embodiments, an interoperable emergency communication system may synchronize with the enrollment data of an organization periodically at a predetermined frequency. e.g. once several hours, once a day, or once a week. In other example embodiments, the synchronization may be triggered by particular event(s), e.g. an enrollment record is added, updated or removed, etc., for example, as below:

1) When a person is newly added into an enrollment system of an organization, the person will be added into appropriate emergency communication group(s) automatically.

2) When a person is removed from the enrollment system, the person will be removed from his/her associated emergency communication group(s) related to the organization automatically.

3) When a person's role/or other information is changed in the enrollment system, associated emergency communication groups of the person will be changed accordingly.

For example, a person may be added into new communication groups, and removed from some communication groups based on his/her new role(s) in accordance with automatic synchronization rule(s) defined for these emergency communication groups. In another example, if a person has moved from School A to School B, then the person will be added into the emergency communication group for School B, and removed from the emergency communication group for School A. In yet another example, if a person's role in a school is changed from a teacher to a safety team member, then the person will be removed from the emergency communication group for teaches and added into the emergency communication group for safety team members.

As detailed below, the Communication Group Synchronization module 212 comprises two components: 1) automatic synchronization rules, and 2) an automatic synchronization process.

1) Automatic Synchronization Rules

To ensure that emergency event information is timely delivered to all of the relevant persons, communication groups may required to be always up to date. In some example embodiments, synchronization rules are defined for automatically synchronizing emergency communication groups related to an organization with information from a human resources management system of the organization, such as an enrollment system or a student information system. For example, instant student accountability of a school is made possible through a secured. periodic (e.g., nightly) synchronization with a Student Information System of the school. This nightly synchronization only pulls, from the Student Information System, data associated with particular data fields, for example, including student names, grade levels, class schedules, and/or emergency contact information, etc. This synchronization may be accomplished through many roster syncing options or through a sftp transfer.

In an example embodiment, to enable automatic synchronization of emergency communication groups, one or more automatic synchronization rules may be defined for each emergency communication group. When automatic synchronization of an emergency communication group is enabled, the following information may require being derived from automatic synchronization rules:

a) Automatic synchronization trigger(s): a frequency for periodically automatic synchronization. e.g., once per day, once per week, etc., or a triggering event, e.g., events on an enrollment system, and b) One or more criteria for categorizing people into the communication group.

People may be added into different emergency communication groups based on their characteristics or properties, for example, buildings people belong to, or roles played by people in an organization, etc. The process of creating a communication group, adding members into a communication group, assigning a particular role to a member of a communication group, and/or updating information of one or more members in a communication group may be accomplished manually or automatically.

In an example embodiment. School A may create a plurality of emergency communication groups to include different groups of people. e.g. School A—Student Emergency Communication Group, School A—Parent Emergency Communication Group, School A—Staff Emergency Communication Group. and School A—Safety Team Emergency Communication Group. Students of School A will be added into the School A—Student Emergency Communication Group, staff members of the school will be added into the School A—Staff Emergency Communication Group, and parents of School A will be added into the School A—Parent Emergency Communication Group. In another example embodiment, a school district may have multiple schools (e.g., School A and School B), and each school in a school district may have its own emergency communication groups. Students, parents and staff members of school A will be added into emergency communication groups related to School A, while students, parents and staff members of School B will be added into emergency communication groups related to School B.

One person can be added into multiple emergency communication groups based on configuration. For example, the principal of School A may be added into all of the emergency communication groups of school A, so that the principal can communicate with students, parents, staff members and safety team members whenever there is an emergency; and a safety team leader may just be added into both the School A—Staff Emergency Communication Group and School A—Safety Team Emergency Communication Group.

Further details of two different kinds of automatic synchronization processes of emergency communication groups are described below in connection with FIG. 4 and FIG. 5.

1. Automatic Synchronization Process—Periodically Automatic Synchronization

Figure 4:
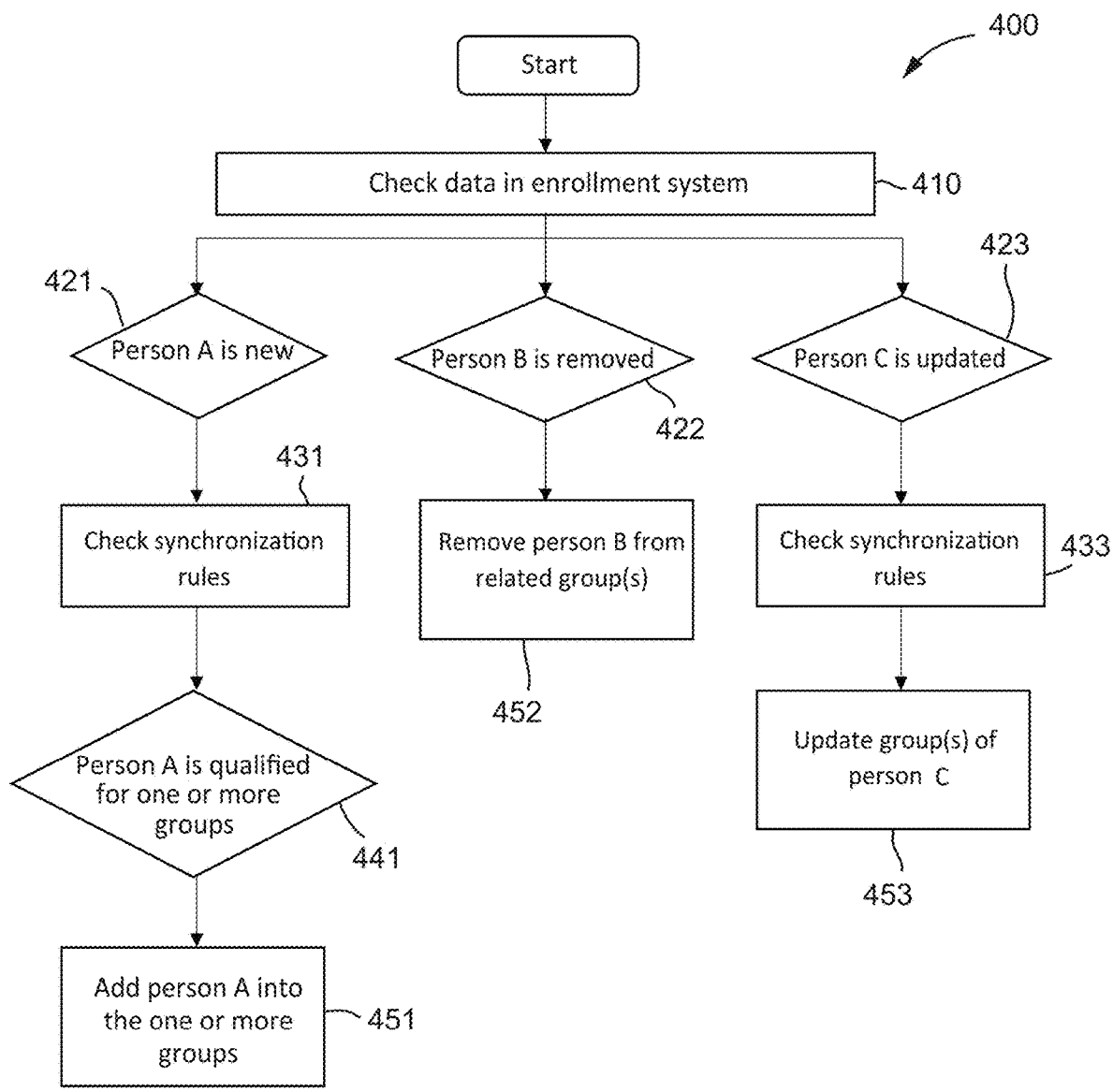
FIG. 4 illustrates a non-limiting, exemplary workflow for synchronizing information of communication groups with information provided by an external system periodically according to one or more example embodiments.

FIG. 4 illustrates a non-limiting, exemplary workflow 400 for synchronizing communication groups with information provided by one or more external systems periodically. The communication groups may be automatically and periodically synchronized with information from one or more external systems managing data of teachers, staff members, students, and parents, such as a student enrollment system or a human resource information system. The synchronization may occur at any predetermined frequency, such as once eight hours, once a day, once three days, or once a week, or any other frequencies.

The periodically automatic synchronization process illustrated by FIG. 4 may be automatically triggered when a predetermined periodical synchronization time comes. At step 410, the interoperable emergency communication system checks data in an enrollment system or other human resource management system of an organization.

Upon determining that person A is new in the enrollment system at step 421, the interoperable emergency communication system checks automatic synchronization rule(s) of each emergency communication group associated with the organization against the characteristics or properties of person A at step 431. If the system determines that person A is qualified for one or more emergency communication groups at step 441, it adds person A into his/her qualified emergency communication groups at step 451.

Upon determining that person B is removed from the enrollment system at step 422, the interoperable emergency communication system removes person B from all emergency communication groups related to the organization at step 452.

Upon determining that relevant characteristics or properties of person C are changed in the enrollment system at step 423, the interoperable emergency communication system checks automatic synchronization rule(s) of each emergency communication group associated with the organization against the information of person C at step 433, and then updates communications groups associated with person C based on the rule checking results at step 453. For example, in accordance with the updated information of person C, the system may remove person C from groups that person C is no longer qualified for, and/or add person C to groups that person C is newly qualified for.

2. Automatic Synchronization Process—Event-Triggered Automatic Synchronization

Figure 5:
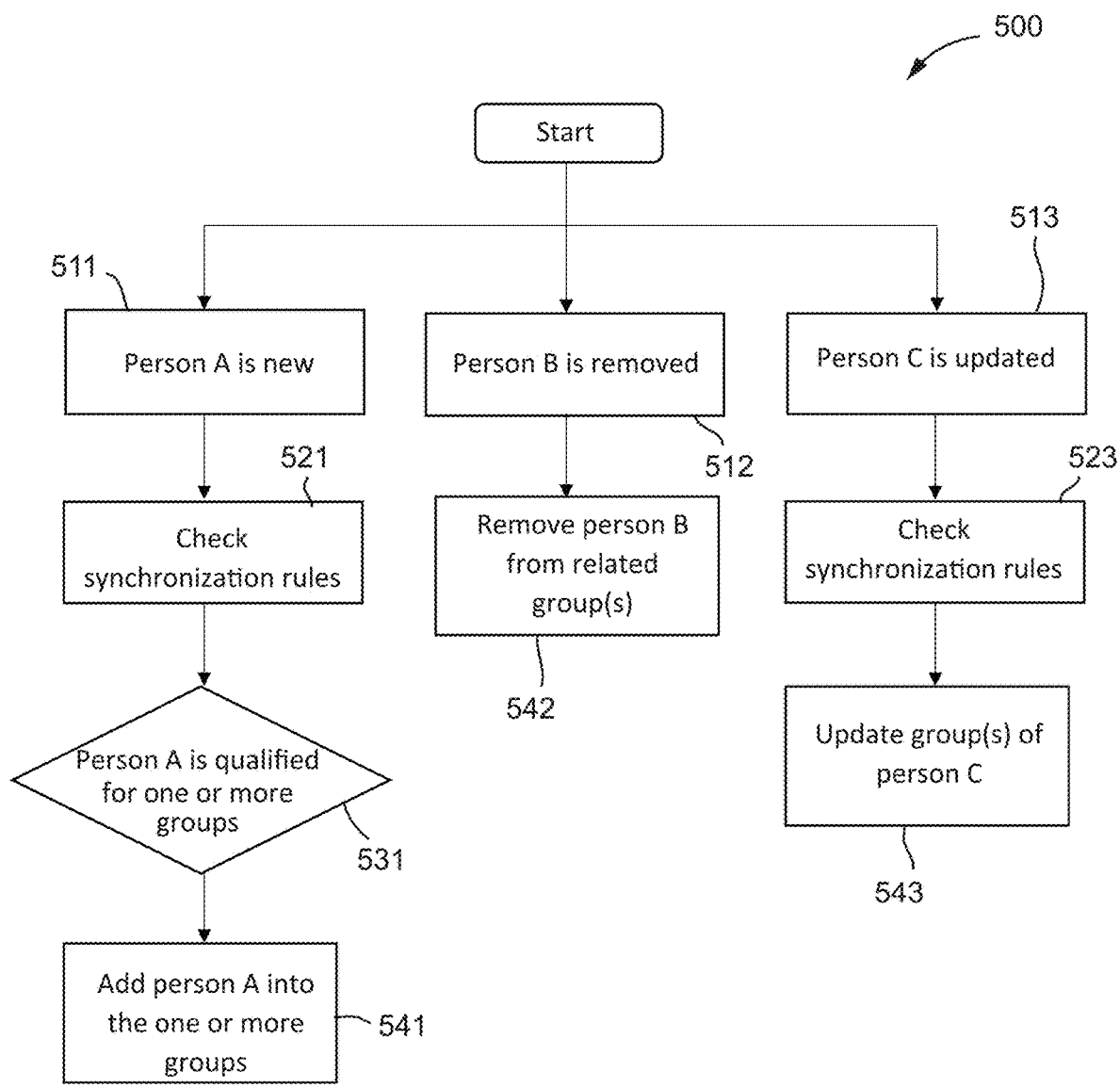
FIG. 5 illustrates a non-limiting, exemplary workflow for synchronizing information of communication groups with information provided by an external system upon detection of particular events according to one or more example embodiments.

FIG. 5 illustrates a non-limiting, exemplary workflow 500 for synchronizing information of communication groups with information provided by an external system upon detection of the occurrence of a particular event.

The event-triggered automatic synchronization process illustrated in FIG. 5 may be triggered when a predefined event occurs. The predefined event may be any kind of event, e.g., adding a person into an enrollment system, removing a person from the enrollment system, or modifying information of a person in the enrollment system.

When person A is added into the enrollment system of an organization at step 511, a process is triggered to check automatic synchronization rule(s) of each emergency communication group associated with the organization against the information of person A at step 521. If it is determined at step 531 that person A is qualified for one or more emergency communication groups based on the automatic synchronization rule(s) of these groups, then person A will be added into each of the emergency communication groups at step 541.

When person B is removed from the enrollment system at step 512, a process is triggered to remove person B from related emergency communication groups at step 542. In an example embodiment, the step 542 may comprises the following steps:

Step 1: determine all emergency communication groups that are associated with the organization and including person B. and then Step 2: remove person B from all of the emergency communication groups determined in Step 1.

When data of person C is changed in the enrollment system at step 513, a process is triggered to perform the following steps:

Step 523: check automatic synchronization rule(s) of each emergency communication group associated with the organization against the information of person C;

Step 543: update communication groups associated with person C in accordance with the automatic synchronization rule(s). In an example embodiment, step 543 may comprise removing person C from those groups that person C is no longer qualified for, and adding person C to those groups that person C is newly qualified for.

The communication groups maintained in an interoperable emergency communication system enable various kinds of intra-organization and inter-organization emergency communications, as detailed below.

II. Intra-Organization Emergency Communication

In certain example embodiments, intra-organization emergency communication requires defining various emergency types based on organization needs and setting up different emergency communication groups for different emergency types or different teams. In an example embodiment, one emergency communication group may be associated with multiple emergency types, e.g. a Tornado, a fire, an active shooter, a bomb threat, a medical emergency, etc. For example, a communication group for a safety emergency team in a school district may be associated with different events occurred in the district, such as an active shooter, a bomb threat and a medical emergency, etc.

Different types of emergency messages or notifications may be communicated to specific emergency communication groups within an organization or outside of the organization. In certain example embodiments, the emergency messages or notifications may include alerts, panic messages, and other reports.

1) Alerts

Figure 6A:
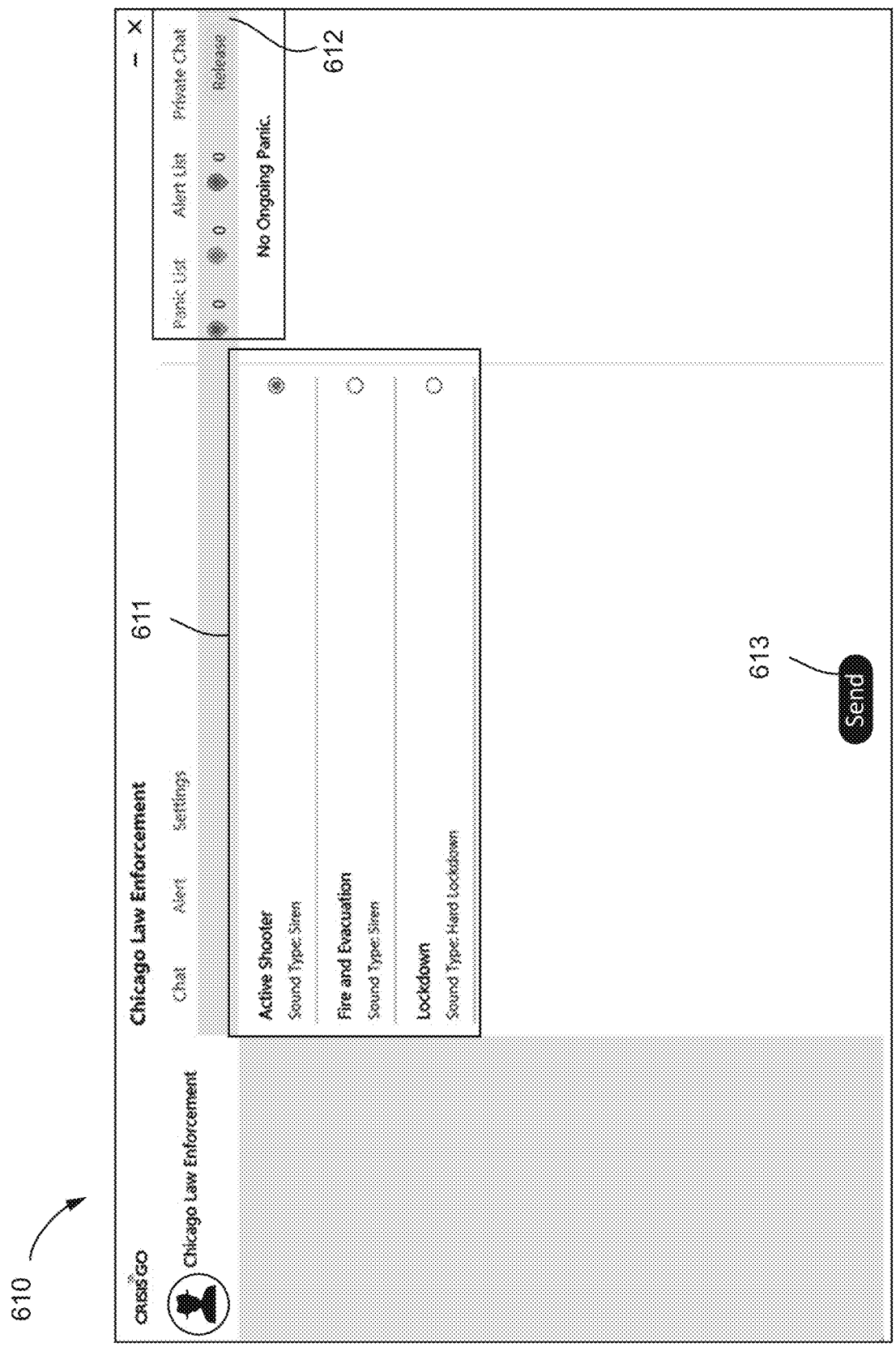
FIG. 6A illustrates a non-limiting, exemplary user interface for generating an example alert according to one or more example embodiments.
Figure 6B:
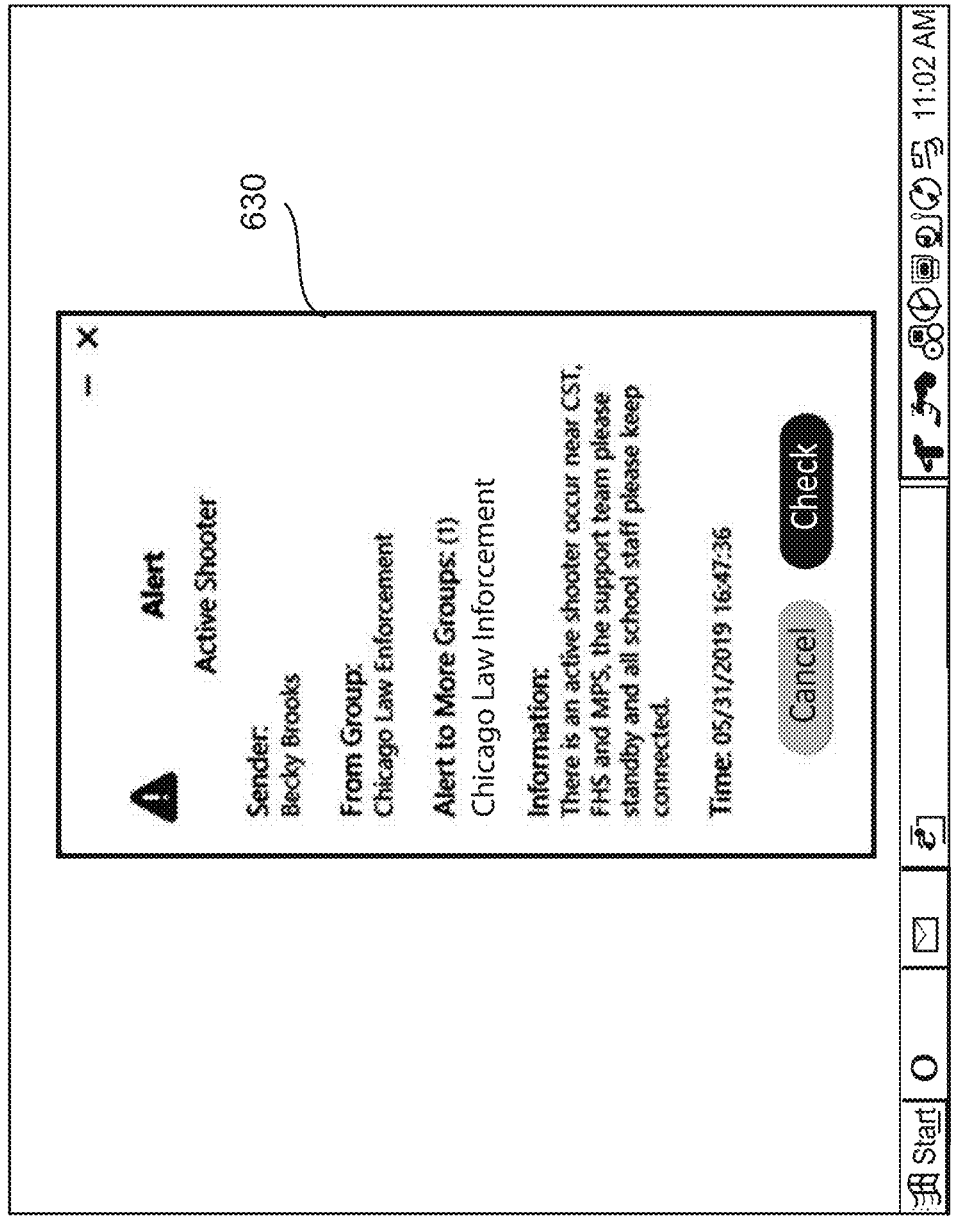
FIG. 6B illustrates a non-limiting, exemplary user interface for displaying an example alert received by a computer according to one or more example embodiments.

FIGS. 6A-6B illustrate non-limiting, exemplary user interfaces for generating, forwarding and displaying an example alert. In an example embodiment, once a user (e.g., Becky Brooks from a Chicago Law Enforcement Communication Group) clicks on an alert icon on the screen of an electronic device operated by the user, e.g., at the bottom of the screen of the electronic device, the user interface 610 shown in FIG. 6A will be generated in order to allow the user to select the appropriate alert type. In other example embodiments, the alert icon may also be displayed in any other section of the screen of an electronic device. In the user interface 610, the user may select an appropriate alert type among three options: 1) Active Shooter, 2) Fire and Evacuation, and 3) Lockdown, as shown in the center portion 611 of the user interface 610. The right section 612 of the user interface 610 shows a list of currently reported panics and/or alerts.

In an example embodiment, after the user has selected the alert type, once the user clicks on a "Send" button 613 in FIG. 6A, an alert will be generated and then sent to everyone in a predetermined emergency communication group, e.g., the emergency communication group to which the user belongs. For example, the user from the Chicago Law Enforcement issues a command. e.g., by clicking on a "Send" button, to send out the alert, and then the alert will be sent to the emergency communication group for the Chicago Law Enforcement. In another example, a teacher in Chicago School for Tech generates an alert and issues a command to send out the alert, and then the alert will be sent to all members of the emergency communication group the teacher belongs to, e.g., Chicago School for Tech (CST)-Staff.

FIG. 6B shows that a dialog 630 is popped up on the screen of a computer operated another member in the Chicago Law Enforcement after the computer operated by the member receives the generated alert. The dialog 630 includes details of the alert, for example, the sender of the alert, the communication group the sender belongs to, the communication group that has received the alert (e.g., Chicago law enforcement), and/or detailed information of the alert.

The user interfaces 610 and 630 in FIGS. 6A and 6B are generated and displayed on the screen of a computer, but in other example embodiment, similar user interfaces may be generated and displayed on the screen of any other kinds of devices, e.g., a smart phone, an iPad or tablet, etc.

In another example embodiment, to send an alert, the user may simply click on a "Fast Alert" icon on the screen, e.g., at the bottom of the screen, select the appropriate type of the alert, and then touch the "Send" icon. In other example embodiment, the "Fast Alert" icon may be displayed on any other locations of the screen. The alert will be automatically sent to all members of predetermined communication group (s), e.g., the communication group(s) the user belongs to. This Fast Alert feature makes setting off an alert even quicker for those who are permitted to do so. In an example embodiment, a Fast Alert icon may appear on any and every screen you may be looking at within the interoperable emergency communication system for a quick access. A user may simply click on the "Fast Alert" icon from any screen or widget of the system and select the desired alert type, and then an alert will be immediately generated and sent to everyone potentially in danger.

The Fast Alert feature may be supported by a computer version or a mobile application version of the interoperable emergency communication system. The computer version of the emergency communication system supports the above described Fast Alert capability from any user interfaces provided by the system or even simply from an icon corresponding to the system in the computer tray.

In another example embodiment, a Cry For Help feature may enable a user to send an audible notification to a safety team by clicking on an icon or button on the screen, e.g., on the bottom of the screen, when there is an emergency event, such as a fight, a suspicious person, or an asthma attack, etc. Alternatively, the Cry For Help icon or button may be shown on any other locations of the screen.

2) Panic Messages

During an isolated incident, a user may send out a panic message to directly request for immediate help from a security team of an organization without alerting the entire organization. In an example embodiment, different from an alert, a panic message will only be sent to managers of an emergency communication group for an organization, but not the other normal members of the communication group. For example, the emergency communication group may be an emergency communication group for a high school, the managers of the communication group may be people in a security team of the school (e.g., principal, law enforcement officers), and normal members of the group may be other employees (e.g., teachers, staff members) of the school. In this way, the generated panic message will only be forwarded to relevant people in the school.

Figures 2, 7A:
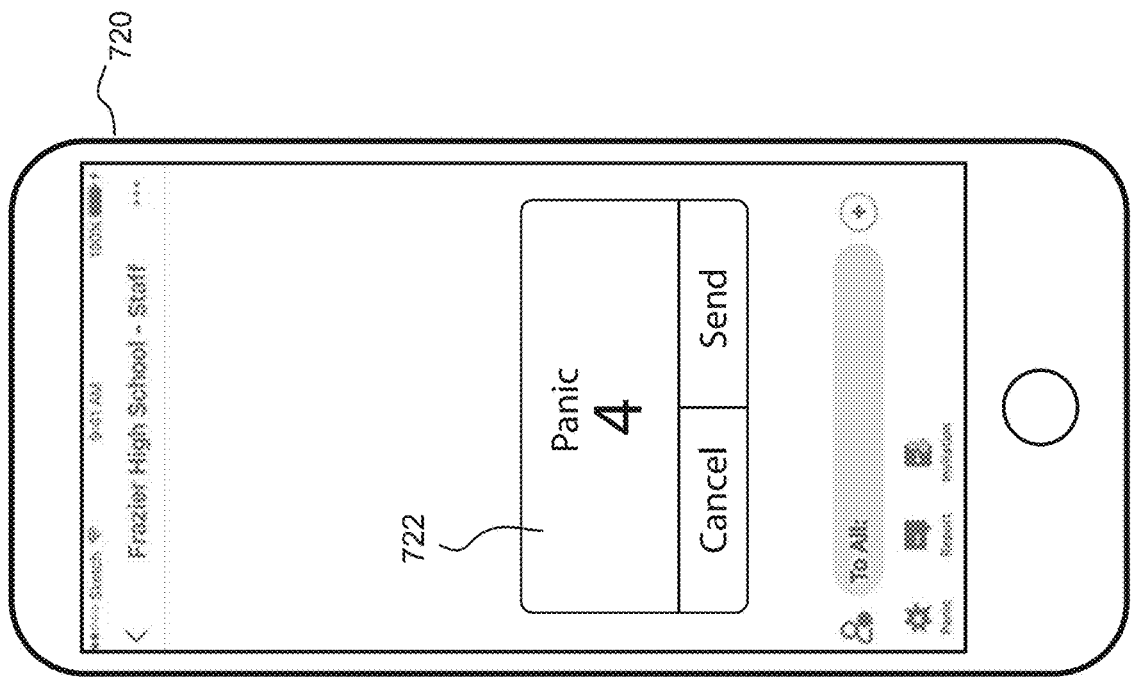
Figures 1, 7A:
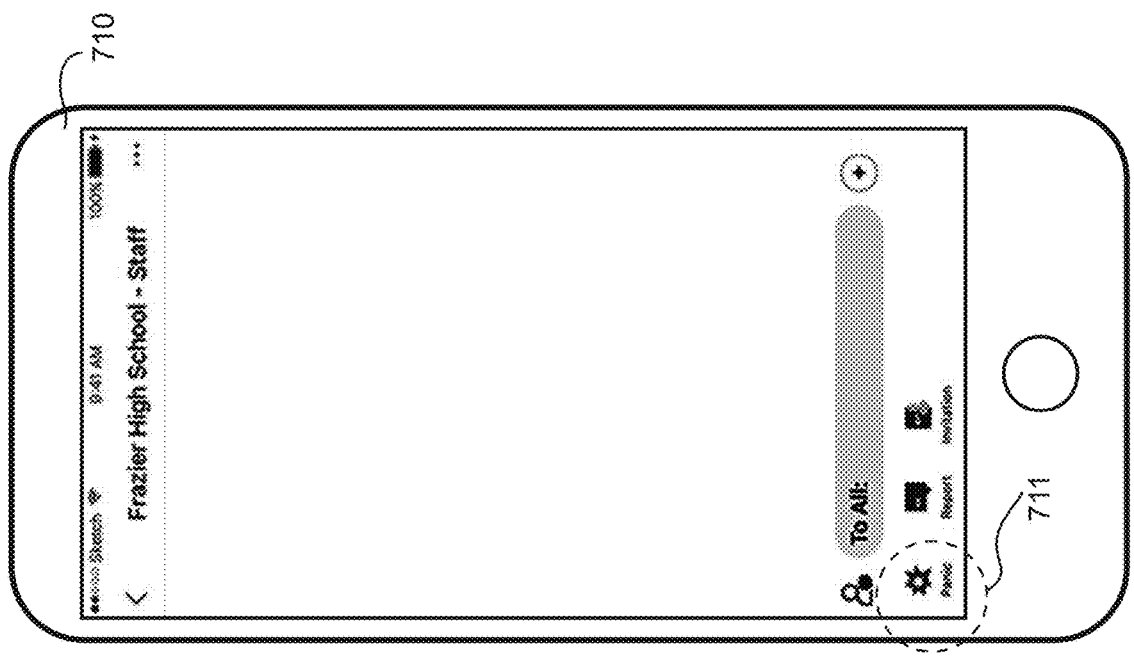
Figure 7B:
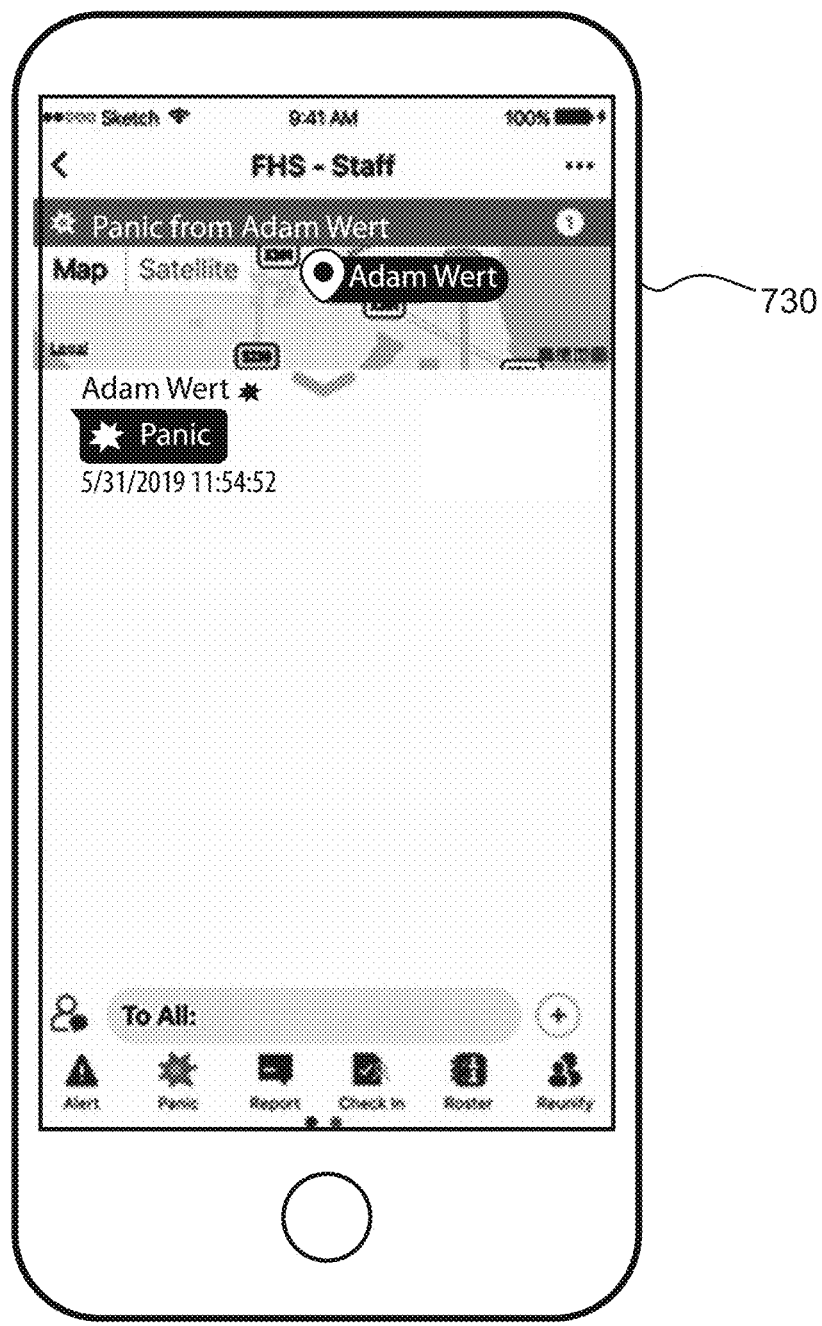
FIG. 7B illustrates a non-limiting, exemplary user interface for displaying an example message related to a panic received by a phone according to one or more example embodiments.
Figure 7C:
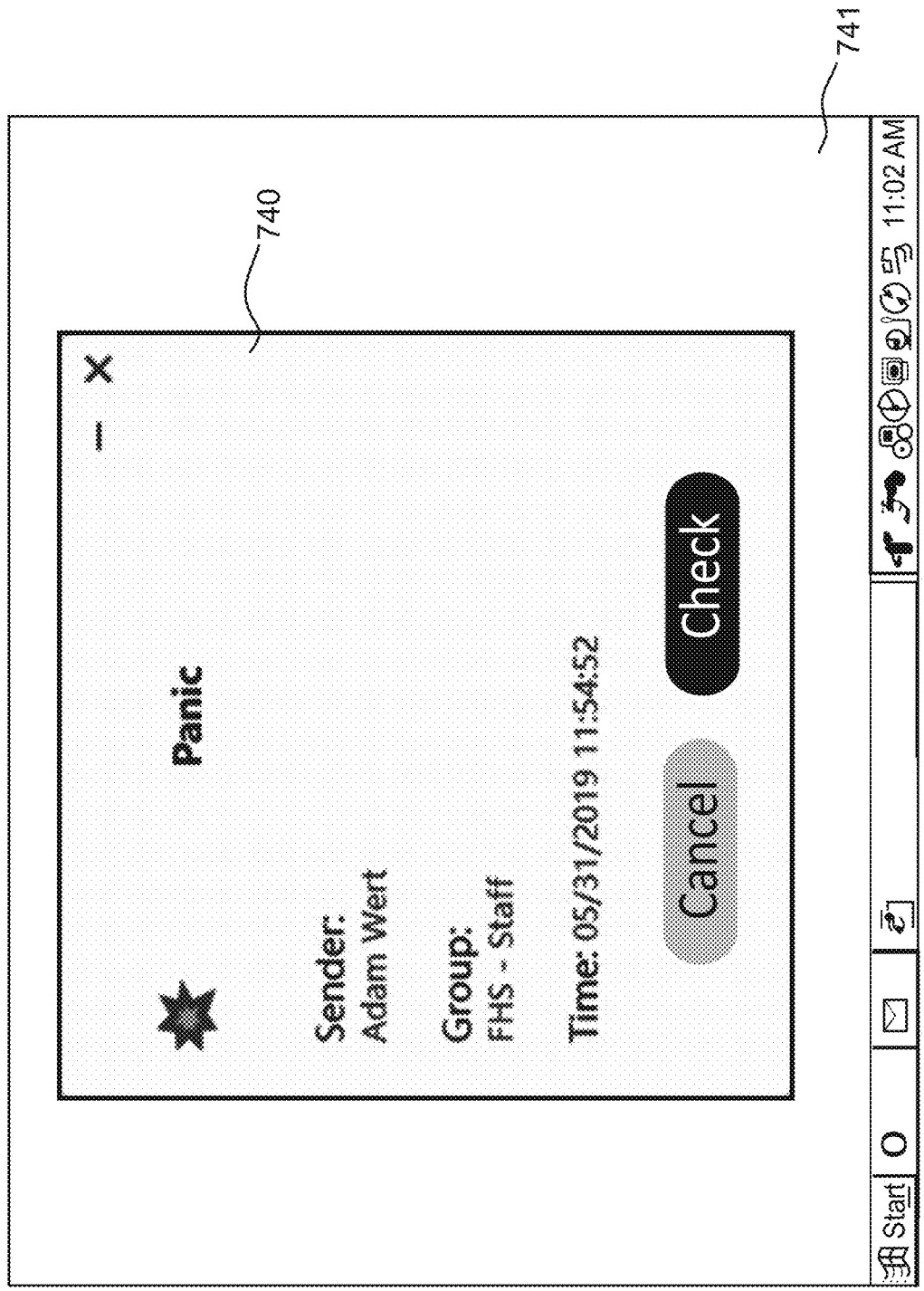
FIG. 7C illustrates a non-limiting, exemplary user interface for displaying an example message related to a panic received by a computer according to one or more example embodiments.

FIGS. 7A-7C illustrate non-limiting, exemplary user interfaces enabling generating a panic report and displaying a received panic report.

FIG. 7A-1 and FIG. 7A-2 illustrate non-limiting, exemplary user interfaces 710 and 720 enabling a staff member from Frazier High School (FHS) to generate a message reporting a panic. To generate a panic, a user may press a "Panic" icon 711 at the bottom of the screen and then over-ride the 5 second countdown by clicking the "Send" icon on the pop-up dialog 722. The 5 second countdown gives a user the time to cancel the panic in case it was triggered in error. In other example embodiments, the "Panic" icon may be displayed in other locations of the screen, and the countdown time may be set to be any other time period, such as 3 second, 8 seconds or 10 seconds, etc.

FIG. 7B illustrates a non-limiting, exemplary user interface for displaying an example message related to a panic message received by a phone, while FIG. 7C illustrates a non-limiting, exemplary user interface for displaying an example message related to a panic message received by a computer. In alternative examples, a panic message may be transmitted to any other kinds of portable electronic devices operated by managers of an emergency communication group. e.g., iPad, tablet, etc.

In the example embodiment shown in FIG. 7C, a dialog 740 popped-up with or without an audible tone on a computer operated by the safety team leaders of an emergency communication group. The safety team leaders may include the principal, a school resource officer and/or law enforcement officers of a school. The dialog 740 indicates who sent the panic message, their GPS location, and allows the user to open an instant communication channel with the sender by clicking on the "Check" button 741. In an example embodiment, all safety team leaders can view each other's communication with other users as they are all managers of the group.

In an example embodiment, even if a computer, a phone or other electronic device is locked, muted or in its sleep mode, it will still display the above described dialogs or messages to the user upon receipt.

In another exemplary scenario, when a teacher sends out a panic message, only some of the leaders of a safety team will receive the message. These safety leaders may communicate with the entire safety leaders group, specific member (s) of the safety team group, or all members of the safety team group. This allows teachers to report things that they might not feel right, with the confidence of knowing that only some of the safety leaders are going to see the message. These safety leaders are tasked with investigating and assessing the situation before potentially alerting the entire group of the situation.

In certain example embodiments, a multimedia message may be shared across communication groups or within a communication group to provide informative emergency messages. The interoperable emergency communication system may support text, voice to text, recorded audio, images, and video within its messaging platform to be sure that all relevant materials may be efficiently shared. All safety features are connected through multimedia messaging because being able to share information back and forth is critical for safety. For example, when a teacher sees a suspicious person in the parking lot, she sets off a panic message for the safety team to investigate, and then the teacher may follow up with a message comprising a photo or video of what she is seeing.

To ensure that emergency alerting and reporting receive immediate attention and response, alerts may be delivered together with an audible tone. In an example embodiment, the audible tone for the alert may override any muting capabilities of the user device, for example, even if a cell phone is muted, it will still enable the audible tone while popping up the alert to the user. This is why having a dedicated channel for emergency communications is beneficial, because the ability to have an audible tone ensures that an important message breaks through the normal daily clutter of messages on other platforms. In an example embodiment, different emergency types within an interoperable emergency communication system may be given different tones. In other example embodiments, an alert for a particular type of emergency events may even be a silent alert.

III. Emergency Communication Escalation

In some situations, communications about an emergency event may require being escalated to others within an organization or relevant people outside of the organization. For these situations, it is imperative to efficiently and effectively alert not only everyone within an emergency communication group but also relevant people in other groups and to make the notified people stay in constant contact to share information timely. Emergency communication escalation may happen within an organization or across multiple organizations.

Figure 8:
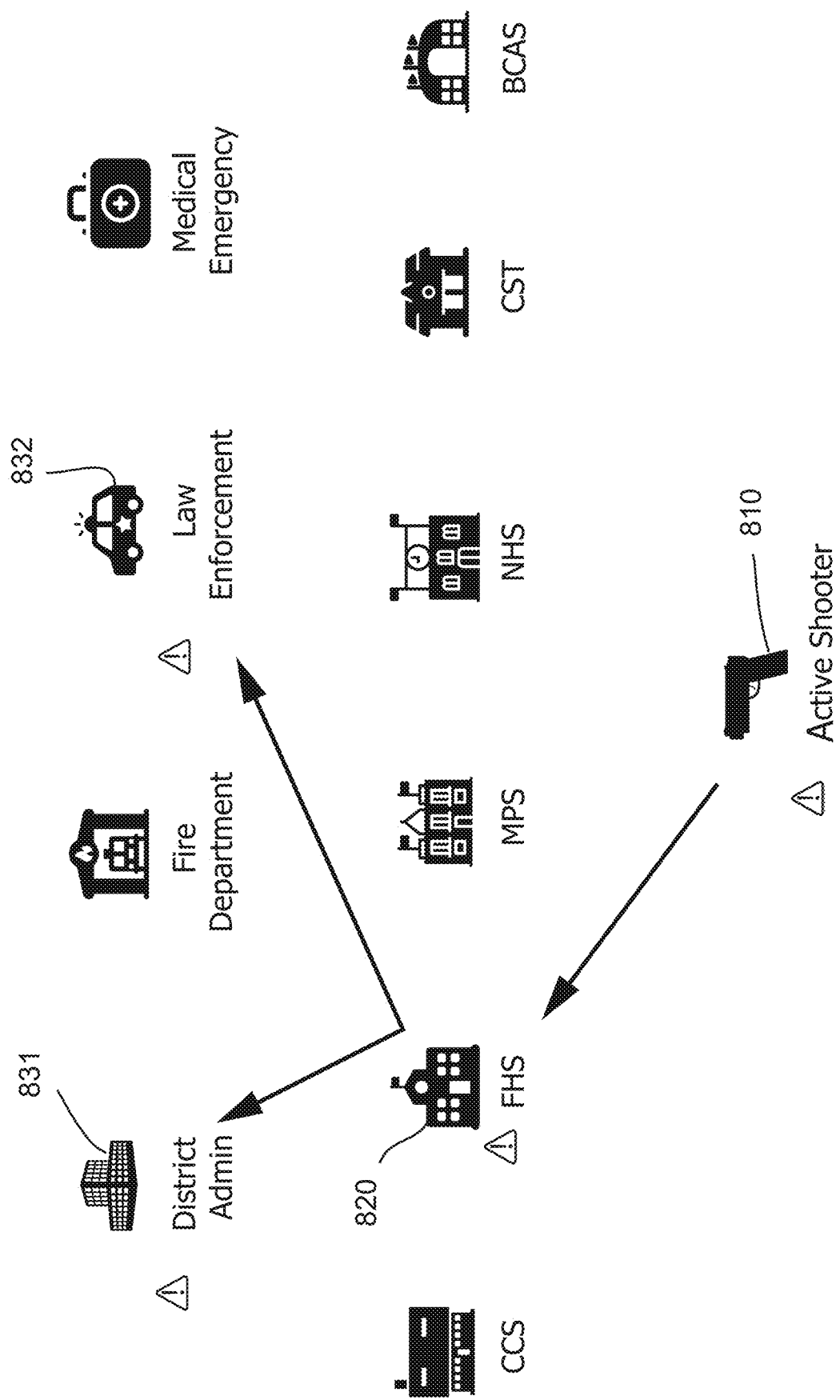
FIG. 8 illustrates a non-limiting, exemplary scenario of emergency communication escalation according to one or more example embodiments.

FIG. 8 illustrates a non-limiting, exemplary scenario of cross-organization emergency communication escalation. When an active shooter event 810 occurs, an alert or panic message will first be sent to an emergency communication group for staff members of Frazier High School (FHS) 820. After that, the panic or alert notification will be escalated to Escalating Emergency Communication Groups, such as, District Administrators 831 and first responders like Law Enforcement 832. In addition, managers and/or normal members of the emergency communication groups for the District Administrators 831 and first responders may be joined into group communications within the FHS staff emergency communication group and may directly communicate with all members of the FHS staff emergency communication group during the crisis. When the active shooter event is resolved, everyone from the emergency communication groups for the District Administrators 831 and first responders will be removed from the FHS staff emergency communication group at given time period. After that, they are not going to receive messages forwarded to the FHS staff emergency communication group anymore.

In another example scenario, a bus driver may report a suspected pedophile hanging around at a bus stop that he was about to drop kids off, and that report may be escalated to local law enforcement for a police response, so that a potential abduction attempt may be thwarted.

Different types of panic or alert events (e.g. a fire, an active shooter, or a medical emergency) may be escalated to different teams or organizations based on pre-define escalation rules. For example, bully reports might go to guidance counselors of a school, while a weapon report might go to law enforcement. Alerts or panic messages of certain types may be automatically escalated to the appropriate first responders (e.g., firefighter or law enforcement officers), so that the first responders can see all of the communications and better understand the situation while they are en route to the scene. A single local police department may be connected to receive escalations from different districts they have in their jurisdiction.

In some example embodiments, a set of rules are pre-defined for the above described escalation and de-escalation processes. Certain users of the system may have the right to define and customize the escalation and de-escalation rules based on particular needs of their organizations. In an example embodiment, an escalation rule may define 1) an escalation event type, 2) one or more Originating Emergency Communication Groups, 3) an escalation option, and/or 4) a geofencing option.

The escalation event type represents the type of an event. e.g., a fire, an active shooter, a medical emergency, etc., or any other critical event that could trigger an escalation process.

In an example embodiment, an Originating Emergency Communication Group may represent a group which a notification about a critical event will be or has been escalated from. In contrast, an Escalating Emergency Communication Group represents a group which a notification about a critical event has been or will be escalated to. For example, an alert or panic message will be escalated from an Originating Emergency Communication Group (e.g., Staff Emergency Communication Group) to an Escalating Emergency Communication Group (e.g., Law Enforcement Emergency Communication Group) by an escalation action.

The escalation option represents different options of an escalation process, for example:

1) Who should be added into an Originating Emergency Communication Group by the escalation action, e.g. normal members and managers in an Escalating Emergency Communication Group, only normal members in the group, only managers in the group, or none. For example, if this option is set to be "None," it means no one in the Escalating Emergency Communication Group should be added into the Originating Emergency Communication Group.

2) Which role should be assigned to those people added into the Originating Emergency Communication Group by the escalation action? For example, this option may make people added in to the Originating Emergency Communication Group be a manager or a normal member of the group.

The geofencing option represents whether and/or how to perform emergency communication escalation based on geofencing. In certain example embodiments, when an alert or panic message is generated, it will be delivered to certain people who are within a pre-defined distance from the location where the alert or panic message is originated.

If the geofencing option is off, an escalation action is based on the escalation option solely. If the geofencing option is on, parameters like a geofencing escalation distance and a geofencing list may require being defined. The geofencing escalation distance defines a required distance between the location of a person who will be added into an Originating Emergency Communication Group by the escalation action and a location where the alert or panic message is originated. The geofencing escalation list defines who should be checked based on the defined geofencing escalation distance requirement. In an example embodiment, a geofencing escalation list may include police officers who are assigned to patrol a specific district, route, etc.

In an example embodiment, if a person should be added into an Originating Emergency Communication Group based on the escalation option, then the person should be included in the geofencing escalation list. The system will check the current location of each person in the geofencing list relative to a location where the alert or panic message is originated to determine whether the geofencing escalation distance requirement is satisfied. If the person is currently located within the defined geofencing escalation distance, then the person should be added into the Originating Emergency Communication Group. If the person is not located within the defined geofencing escalation distance, the person should not be added into the Originating Emergency Communication Group.

In certain example embodiments, if the person is not in a geofencing escalation list, as long as a person should be added into the Originating Emergency Communication Group based on the escalation option, the person will still be added into the Originating Emergency Communication Group. For example, based on the escalation option, certain members of the pre-defined Escalating Emergency Communication Group, e.g., the emergency communication groups for the District Administrators 831 and first responders, may be added into the Escalating Emergency Communication Group by an escalation action, regardless that these members are not listed in the geofencing escalation list.

In an example embodiment, an emergency communication group 1 includes local first responders in a district, such as law enforcement officers, firefighters, etc., and emergency communication groups 2, 3, 4 are emergency communication groups for school A, school B and school C respectively. An escalation rule defined for the emergency communication group 1 may be: when a critical event like an Active shooter, a bomb threat, a lockdown occurs, an alert or a panic message will be triggered in the emergency communication group 2, 3, or 4, and then the notification will be escalated to the emergency communication group 1, everyone or people of specific role(s) in the emergency communication group 1 will receive the alert or panic message, and/or will be added into the emergency communication group 2, 3, or 4 automatically based on the defined escalation option and geofencing option.

If the geofencing option is off, when people from the Escalating Emergency Communication Group (the emergency communication group 1) are added into the Originating Emergency Communication Group (the emergency communication group 2, 3 or 4), the escalation action will be performed based on the defined escalation option only, which may, for example, be any of the followings:

1) Only the managers from the Escalating Emergency Communication Group should be added into the Originating Emergency Communication Group as managers. That is, all managers in the emergency communication group 1 will be added into the emergency communication group 2, 3, or 4 as managers of the group automatically.

2) Only the managers from the Escalating Emergency Communication Group should be added into the Originating Emergency Communication Group as normal members. That is, all managers in the emergency communication group 1 will be added into the emergency communication group 2, 3, or 4 as normal members of the group automatically.

3) Both the managers and normal members from the Escalating Emergency Communication Group should be added into the Originating Emergency Communication Group as managers. That is, all managers and normal members in the emergency communication group 1 will be added into the emergency communication group 2, 3, or 4 as managers of the group automatically.

4) Both the managers and normal members from the Escalating Emergency Communication Group should be added into the Originating Emergency Communication Group as normal members. That is, all managers and normal members in the emergency communication group 1 will be added into the emergency communication group 2, 3, or 4 as normal members of the group automatically.

5) If the escalation option defines that no one should be added into the Originating Emergency Communication Group, then no one from the emergency communication group 1 should be added into the emergency communication group 2, 3, or 4 automatically.

In another example embodiment, the geofencing option is on, and the geofencing escalation distance is set as 5 miles. People from the emergency communication group 1 may be added into the emergency communication group 2, 3, or 4 based on both the escalation option and the geofencing option, for example:

1) Only the managers from the Escalating Emergency Communication Group should be added into the Originating Emergency Communication Group as managers. Thus, any manager in the emergency communication group 1 will be added into the emergency communication group 2, 3, or 4 automatically as a manager of the group, if his/her current location is within 5 miles scope from the alert originating location or he/she is not in the geofencing escalation list.

2) Only the managers from the Escalating Emergency Communication Group should join the Originating Emergency Communication Group as normal members. That is, any manager in the emergency communication group 1 will be added into the emergency communication group 2, 3, or 4 automatically as a normal member of the group, if his/her current location is within 5 miles scope from the alert originating location or he/she is not in the geofencing escalation list.

3) Both the managers and normal members from the Escalating Emergency Communication Group should join the Originating Emergency Communication Group as managers. That is, any manager or any normal member in the emergency communication group 1 will be added into the emergency communication group 2, 3, or 4 automatically as a manager of the group if his/her current location is within 5 miles scope from the alert originating location or she/he is not in geofencing escalation list.

4) Both the managers and normal members from the Escalating Emergency Communication Group should join the Originating Emergency Communication Group as normal members. That is, any manager or any normal member in the emergency communication group 1 will be added into the emergency communication group 2, 3, or 4 automatically as a normal member of the group if her/his current location is within 5 miles scope from alert originating location or she/he is not in geofencing escalation list.

5) If escalation option defines that no one should join the emergency communication group 2, 3, or 4, then no one from emergency communication group 1 should be added into the emergency communication group 2, 3, or 4 automatically.

Figure 9:
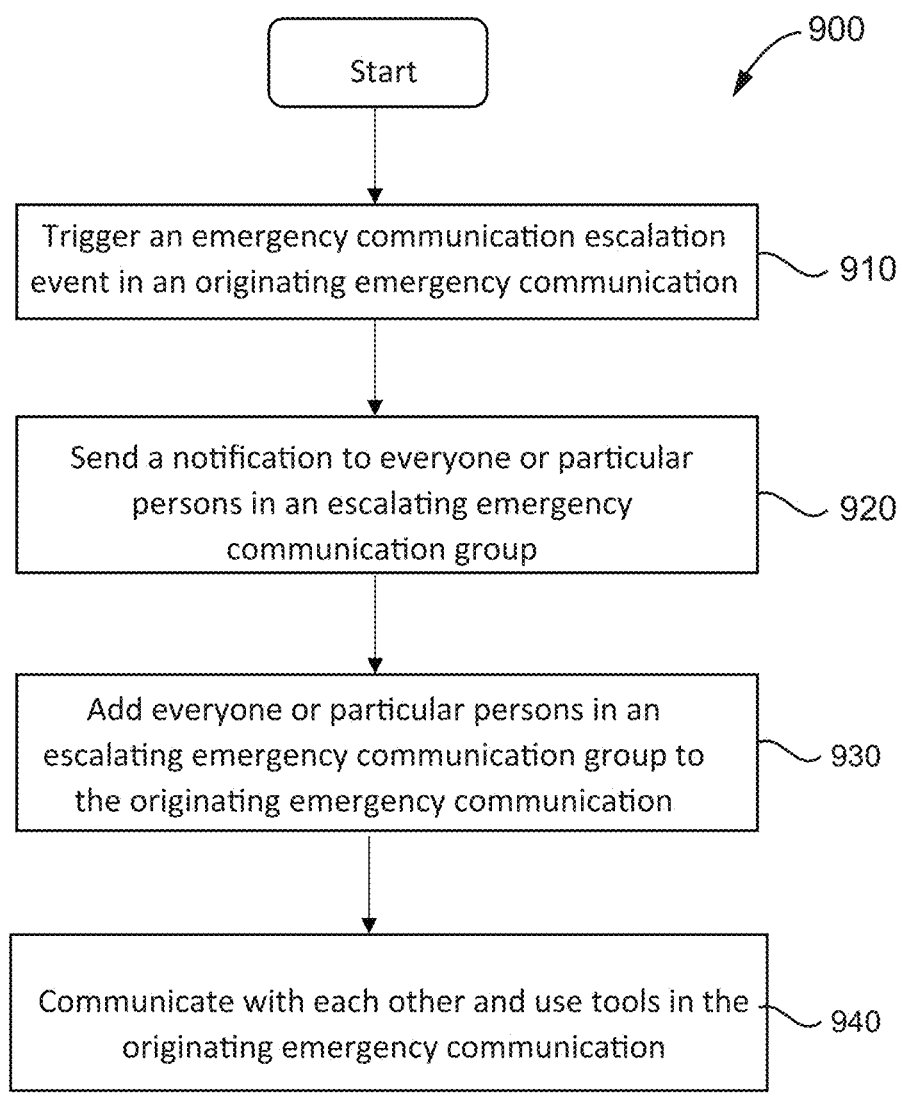
FIG. 9 illustrates a non-limiting, exemplary workflow for emergency communication escalation according to one or more example embodiments.

FIG. 9 illustrates a non-limiting, exemplary workflow for an emergency communication escalation process. At Step 910, an emergency communication escalation event is trigged in an Originating Emergency Communication Group. At Step 920, the system sends a notification to everyone or only people with specific role(s) of an Escalating Emergency Communication Group. That is, depending on the defined escalation option, everyone or only people with specific role(s) in the Escalating Emergency Communication Group receives the notification. At Step 930, the system adds every member or only member(s) with specific role(s) in the Escalating Emergency Communication Group into the Originating Emergency Communication Group as managers or normal members based on the defined escalation option and geofencing option. At Step 940, members who were added into the Originating Emergency Communication Group from the Escalating Emergency Communication Group may be able to receive all communications in the Originating Emergency Communication Group. and will be able to communicate with others and use tools provided in the Originating Emergency Communication Group. The members escalated into the group may be able to send one or more messages to all of other members in the groups or only members with specific roles. In some example embodiments, only members added into the Originating Emergency Communication Group as managers of the group may be able to receive all communications in the group, members added into the group as normal members may only be able to receive part of the communications, e.g., only alerts.

In an example embodiment, an interoperable emergency communication system may be able to automatically dial 911 upon triggering an alert or panic message of certain types.

Figure 10A:
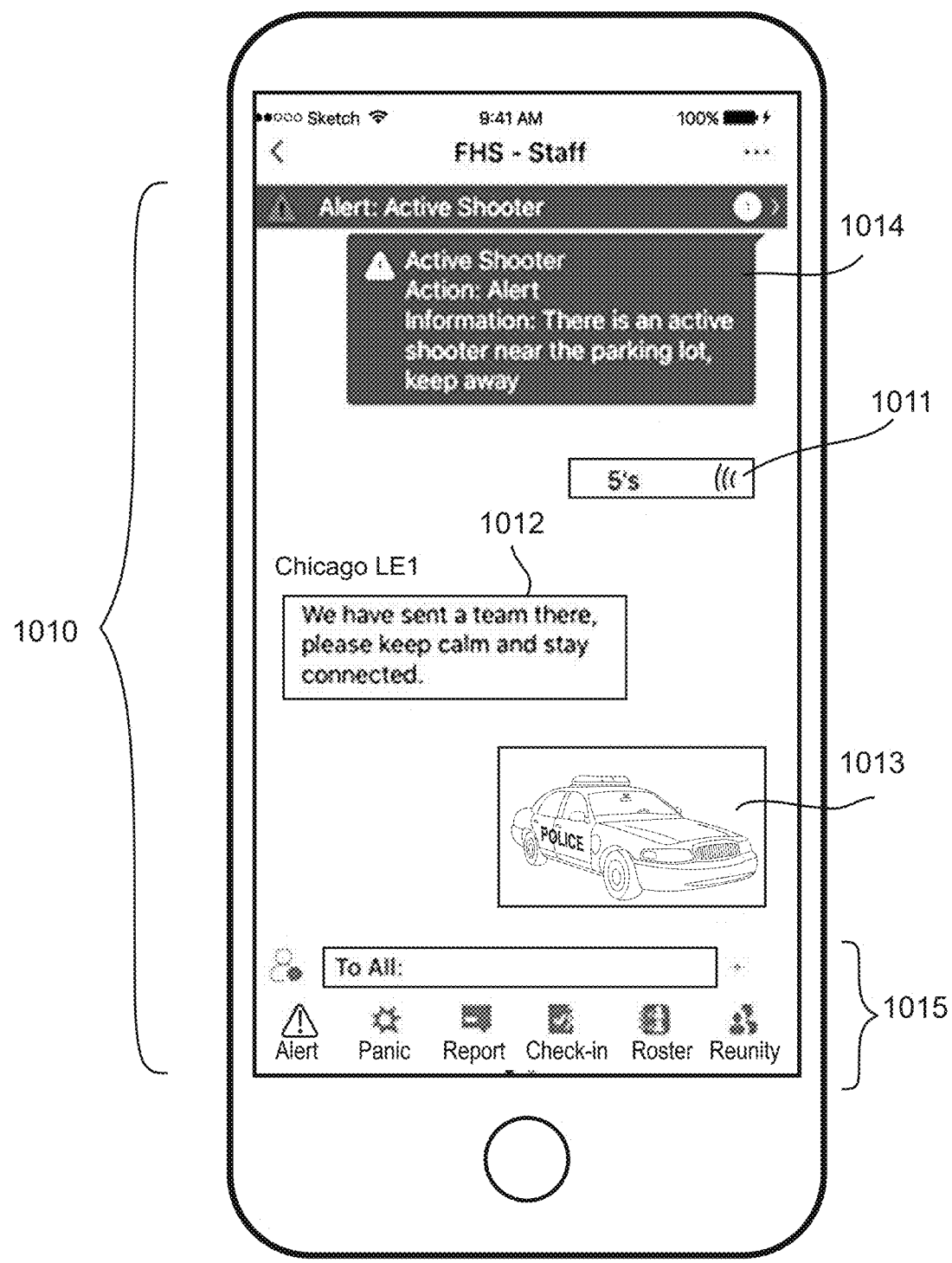
FIG. 10A illustrates a non-limiting, exemplary user interface for enabling a staff member to communicate with other members in an originating communication group for a reported alert according to one or more example embodiments.

FIG. 10A illustrates a non-limiting, exemplary user interface 1010 generated on an electronic device operated by a staff member in an Originating Emergency Communication Group (e.g., FHS Staff Emergency Communication Group). The alert notification received by the staff member is displayed on the top section 1014 of the user interface 1010. In an example embodiment, as shown in the bottom section 1015 of the user interface 1010, a series of tools are available to the staff member. For example, the staff member is able to communicate with other members in the Originating Emergency Communication Group for the reported alert. As shown in FIG. 10A, the staff member may post an audio message 1011 in the Originating Emergency Communication Group, e.g., to report what has happened at school, and then post a picture 1013 that he took to show that a police car has already arrived at the school, etc. In the meantime, the staff member is able to view the textual message posted by a police officer (e.g., Chicago LE1) from an Escalating Emergency Communication Group (e.g., Chicago Law Enforcement Emergency Communication Group).

Figure 10B:
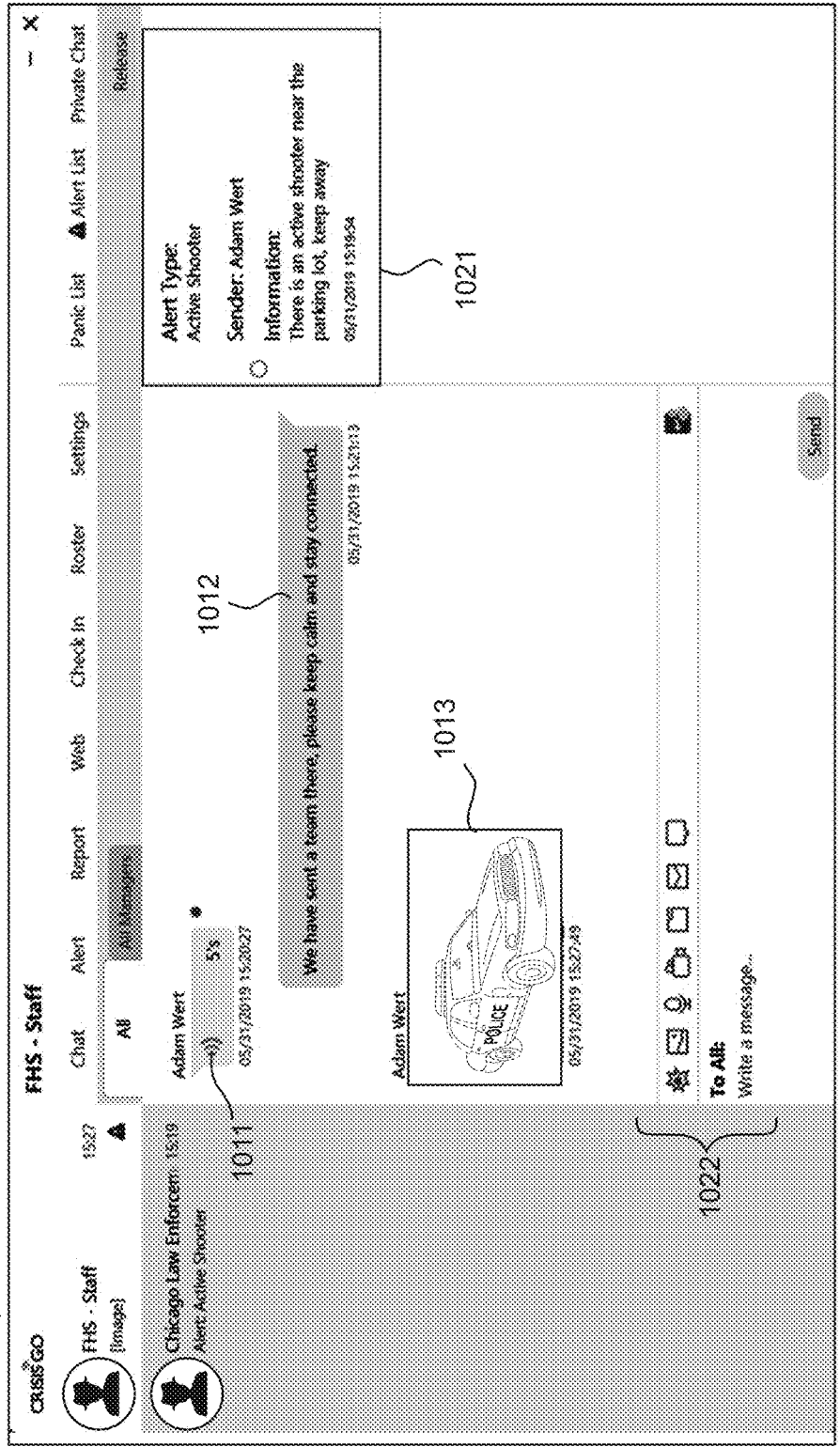
FIG. 10B illustrates a non-limiting, exemplary user interface for enabling a police officer to communicate with other members in the originating communication group for the reported alert according to one or more example embodiments.

On the other hand, FIG. 10B illustrates a non-limiting, exemplary user interface 1020 generated on an electronic device operated by the police officer from the Escalating Emergency Communication Group (e.g., Chicago Law Enforcement Emergency Communication Group). In this example embodiment, the user interface 1020 is generated and displayed on a computer used by the police officer, in other example embodiments, a user interface similar to the user interface 1020 may be generated and displayed on any other kinds of electronic devices operated by the police officer, e.g., a smart phone, an iPad, a tablet, or other portable electronic devices.

Information regarding the alert received by the police officer is displayed on the right section 1021 of the user interface 1020. In an example embodiment, as shown in the bottom section 1022 of the user interface 1020, a series of tools are available to the police officer. The police officer is able to communicate with other members in the Originating Emergency Communication Group (e.g., FHS Staff Emergency Communication Group) after the police officer is added into the group by an escalation action. As shown in FIG. 10B, the police officer is able to access the audio message 1011 and picture 1013 posted by the staff member—Adam Wert of FHS, and to post a textual message 1012 in the FHS Staff Emergency Communication Group.

In this way, the first responders like police officers or firefighters from an Escalating Emergency Communication Group will not only be notified of the occurrence of an emergency event, but also be able to stay in contact with people involved in the emergency event during and after the emergency situation. Further, multimedia messages may be shared within the Originating Emergency Communication Group. The multimedia messages may include textual messages, images, audios, and/or videos.

Figure 11A:
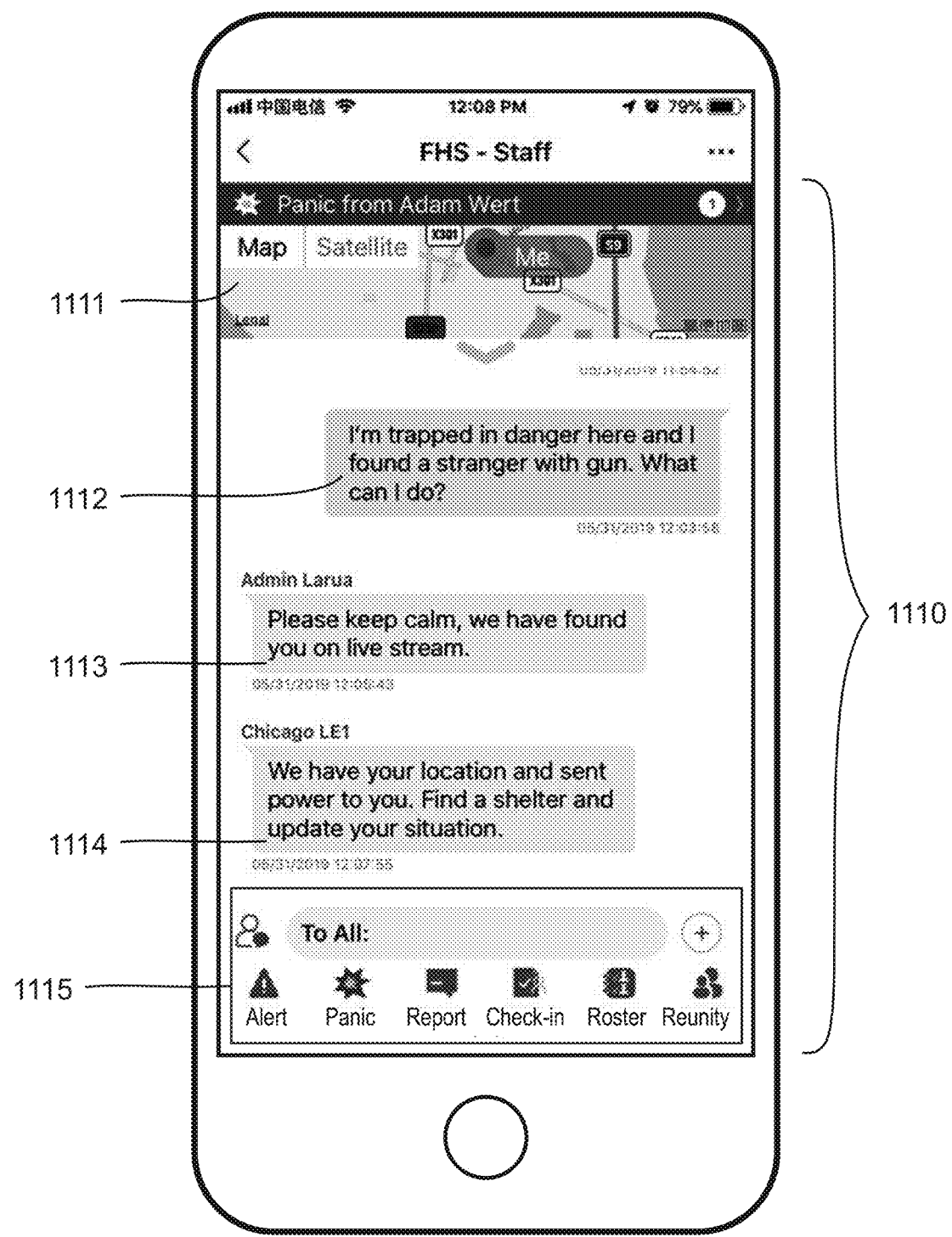
FIG. 11A illustrates a non-limiting, exemplary user interface for enabling a person who triggered a panic message to communicate with other members in an originating communication group for the reported panic according to one or more example embodiments.

FIG. 11A illustrates a non-limiting, exemplary user interface 1110 generated on an electronic device operated by a person who triggered a panic message (e.g., Adam Wert). In an example embodiment, the panic originating person may be able to communicate with managers in the Originating Emergency Communication Group (e.g., FHS Staff Emergency Communication Group) for the reported panic. The generated panic message is displayed on the top section 1111 of the user interface 1110. In an example embodiment, as shown in the bottom section 1115 of the user interface 1110, a series of tools are available to the panic originating person. The panic originating person is able to post a textual message in the FHS Staff Emergency Communication Group to let managers in the group to know that he is in trouble. Meanwhile, the panic originating person is able to view a textual message 1113 posted by a staff member (e.g., Admin Larua), and a textual message 1114 posted by a police officer (e.g., Chicago LE1) who is added into the FHS Staff Emergency Communication Group due to an escalation action.

Figure 11B:
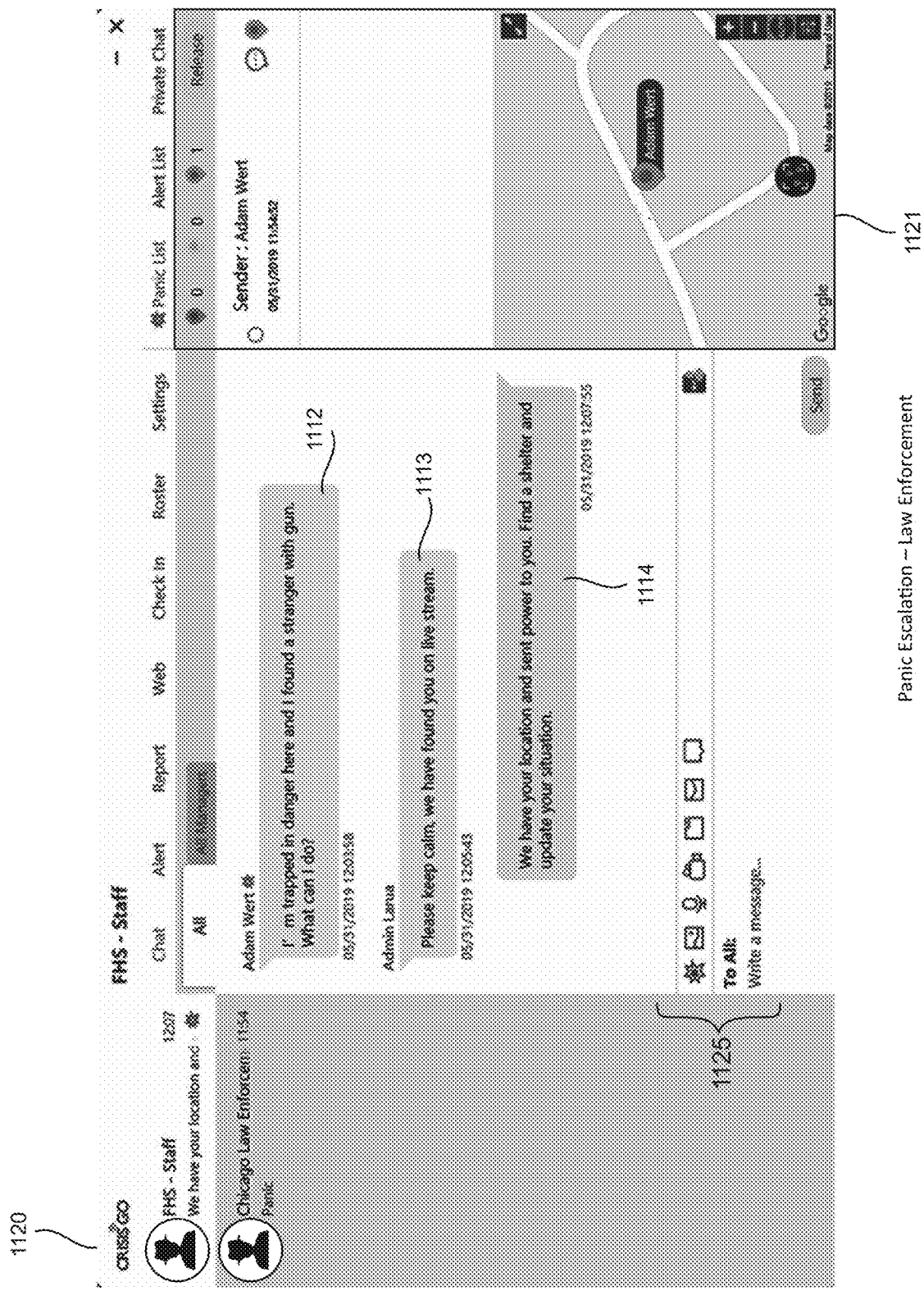
FIG. 11B illustrates a non-limiting, exemplary user interface for enabling a police officer to communicate with other members in the originating communication group for the reported panic according to one or more example embodiments.

FIG. 11B illustrates a non-limiting, exemplary user interface 1120 generated on an electronic device operated by the police officer from the Escalating Emergency Communication Group (e.g., Chicago Law Enforcement Emergency Communication Group). In this example embodiment, the user interface 1120 is generated and displayed on a computer used by the police officer, in other example embodiments, a user interface similar to the user interface 1020 may be generated and displayed on any other kinds of electronic devices operated by the police officer, e.g., a smart phone, an iPad, a tablet, or other portable electronic devices.

The received panic message is displayed on the right section 1121 of the user interface 1120. In an example embodiment, as shown in the bottom section 1125 of the user interface 1120, a series of tools are available to the police officer. The police officer is able to communicate with managers in the Originating Emergency Communication Group (e.g., FHS Staff Emergency Communication Group) for the reported panic. In particular, the police officer is able to view the messages posted by the person who triggered the panic message (e.g., Adam Wert), and by the staff member (e.g., Admin Larua). Meanwhile, the police officer is able to post a message 1114 in the Originating Emergency Communication Group.

When the emergency situation is resolved or ended, a de-escalation process will be triggered to reverse the escalation action, for example, people who were added into an Originating Emergency Communication Group due to an escalation action will be removed from the Originating Emergency Communication Group. In the example embodiment described above, a de-escalation rule defined for the emergency communication group 1 may be: when the escalation event is resolved or ended, all members from the emergency communication group 1 will be removed from the emergency communication group 2, 3, 4, 7, 8, or 9 within a pre-defined time period, e.g. immediately, 10 minutes, 1 hour or 24 hours, etc.

Figure 12:
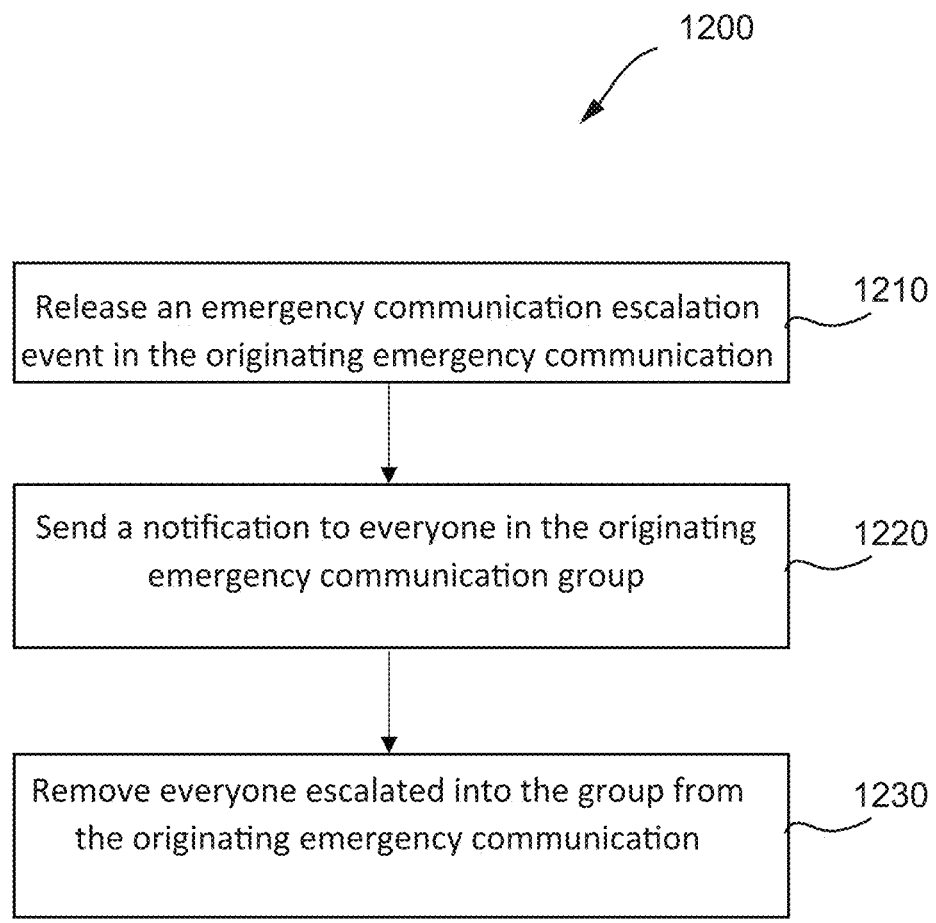
FIG. 12 illustrates a non-limiting, exemplary workflow for de-escalating emergency communication according to one or more example embodiments.

FIG. 12 illustrates a non-limiting, exemplary workflow 1200 for de-escalating emergency communication. At Step 1210, an escalation event is released in the Originating Emergency Communication Group. At Step 1220, a de-escalation notification is sent to everyone in the Originating Emergency Communication Group. At Step 1230, based on a pre-defined De-escalation rule, every member escalated into the Originating Emergency Communication Group because of the escalation action will be automatically or manually removed from the Originating Emergency Communication group, so that he/she is no longer able to receive communication messages in the group.

In view of the above, an example escalation and de-escalation process may be:

An active shooter event is triggered in a School A Staff Emergency Communication Group, and then the emergency event is escalated to a First Responder Emergency Communication Group. That is, everyone in the emergency communication group for the first responders will receive the emergency event message, and will be added into the School A Staff Emergency Communication Group. As a result, all of the first responders can receive messages sent in the School A Staff Emergency Communication Group to be aware of real time onsite status, and they can communicate with the staff members in the School A Staff Emergency Communication Group. When the active shooter event is resolved, everyone escalated from the First Responder Emergency Communication Group will be removed from the School A Staff Emergency Communication Group within a given time period. After that, members escalated from the First Responder Emergency Communication Group are not going to receive messages sent into School A Staff Emergency Communication Group anymore, unless they re-join the group again.

The Emergency Communication Escalation allows users to instantly notify primary and extended primary responders, and provides a streamlined process to ensure that the right information reaches the right people in a timely manner. By virtue of the Emergency Communication Escalation feature, based on the alert types, administrators and local first responders may be automatically and immediately added into the group communications and may have direct access to members of the group during the crisis. Moreover, all relevant people are able to directly communicate with each other during and after the emergency situation.

IV. Emergency Communication Broadcasting

In some critical situations, information about an emergency event may require being sent to multiple organizations/teams to alert those organizations/teams and may also require triggering an emergency response in those organizations/teams immediately. For example, local administrators or a local law enforcement department of a district or area may require reporting an emergency event to multiple schools and/or organizations within a specific district.

Figure 13:
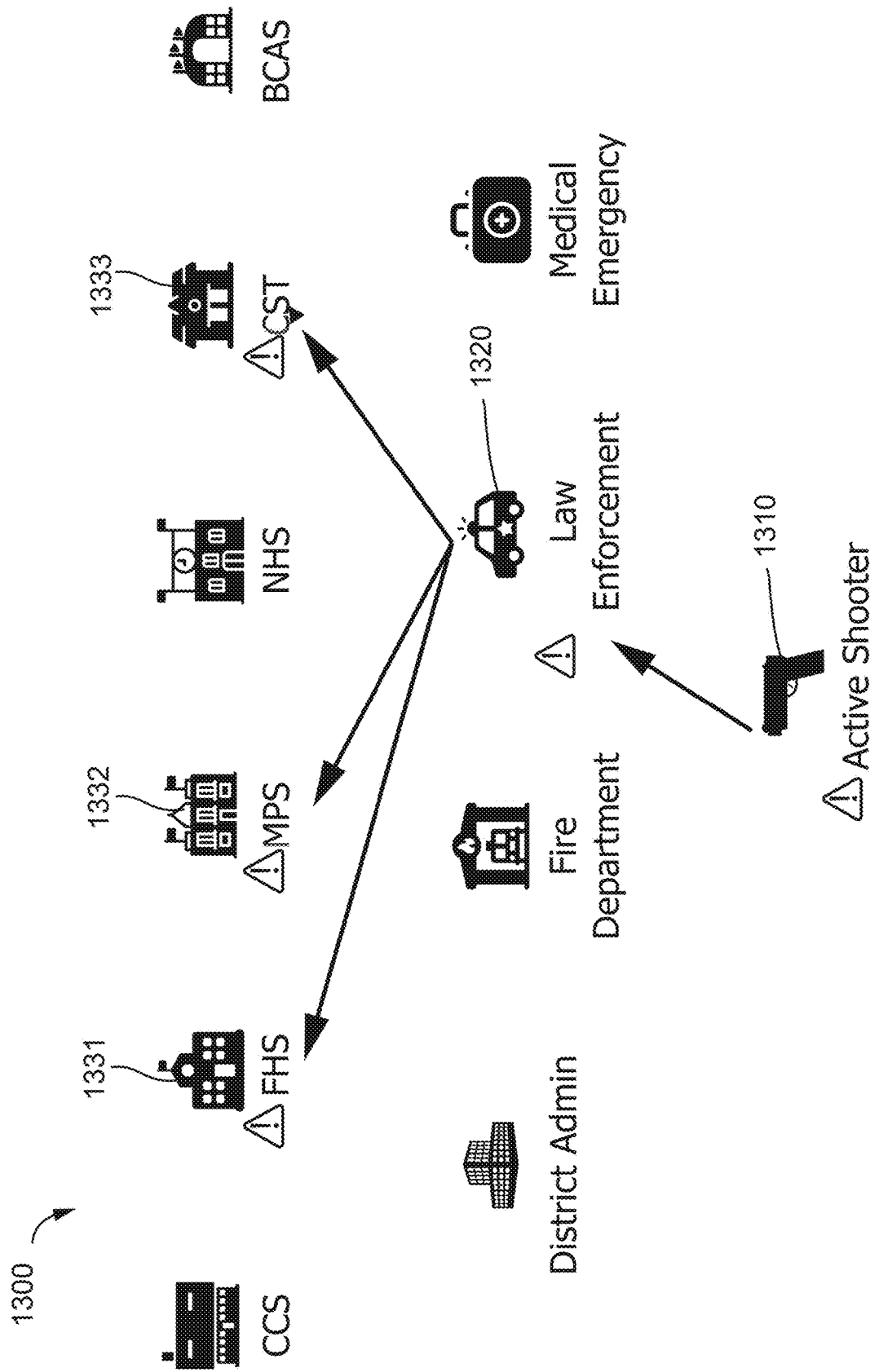
FIG. 13 illustrates a non-limiting, exemplary scenario for emergency communication broadcast according to one or more example embodiments.

Emergency communication broadcasting may happen within an organization or across organizations. In a non-limiting, exemplary scenario illustrated in FIG. 13, when an active shooter event 1310 occurs at a school, an alert is sent to law enforcement 1320 close to the school. Based on the location and situation of the active shooter event, the emergency event notification could be sent to emergency communication groups of different organizations or teams nearby the school, for example, Frazier High School (FHS) 1331, Morgan Park School (MPS) 1332, and Chicago School for Tech (CST) 1333. In an example embodiment, the emergency communication groups of those schools receive information about the emergency event, and then an alert may be triggered to inform all key personnel of the schools.

In certain example embodiments, emergency broadcasting rule(s) may be defined for an emergency communication group, so that the emergency communication group may automatically broadcast emergency events of certain types to pre-defined organizations in accordance with the defined rule(s). An emergency broadcast rule may specify, for example, 1) type(s) of emergency events that need to be broadcasted, and/or emergency communication group(s) to which information about an emergency event will be sent. These emergency communication group(s) could belong to the same organization or different organizations.

Figure 14:
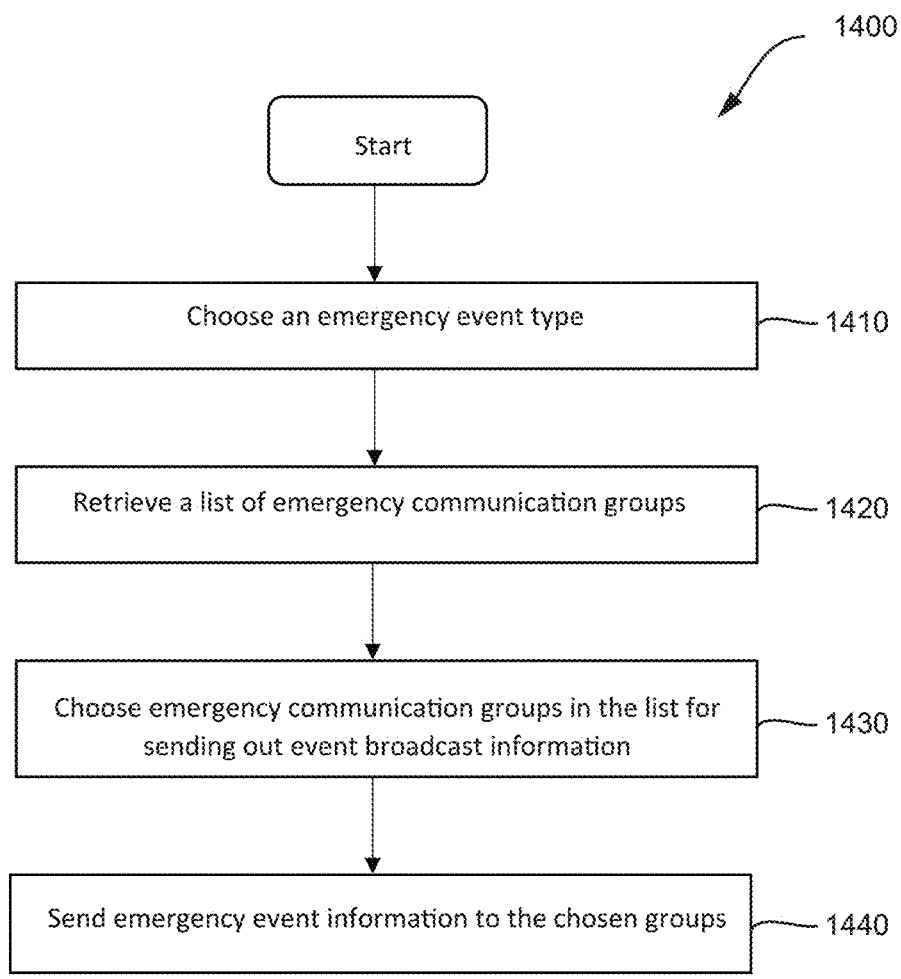
FIG. 14 illustrates a non-limiting, exemplary workflow for emergency communication broadcast according to one or more example embodiments.

FIG. 14 illustrates a non-limiting, exemplary workflow 1400 for an emergency communication broadcast process. The system may choose the type of an emergency event at Step 1410, and then get a list of emergency communication groups to which the emergency event can be broadcasted at step 1420. At step 1430, the system may choose emergency communication groups in the list for sending out information about the emergency event. After that, at step 1440, the information about the emergency event will be sent out to the emergency communication groups chosen at step 1430. In an example embodiment, everyone in the emergency communication groups will receive the emergency event information, so that everyone in these groups will be alerted immediately.

In certain example embodiments, information about an emergency event may be broadcasted by manually selecting emergency communication groups to which information about an emergency event may be broadcasted.

Figure 15A:
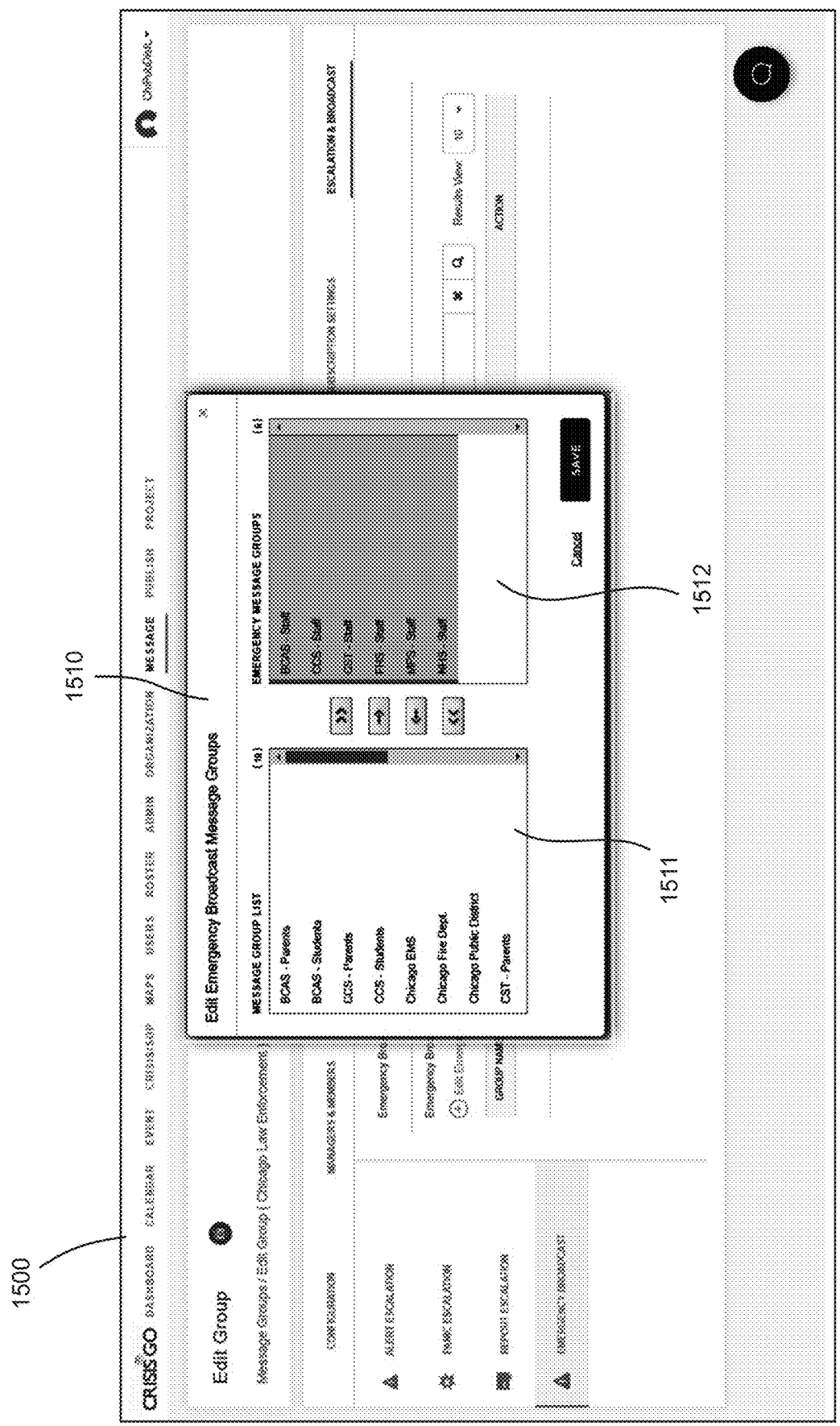
FIG. 15A illustrates a non-limiting, exemplary user interface enabling editing emergency communication groups to which information about an emergency event will be broadcasted according to one or more example embodiments.
Figure 15B:
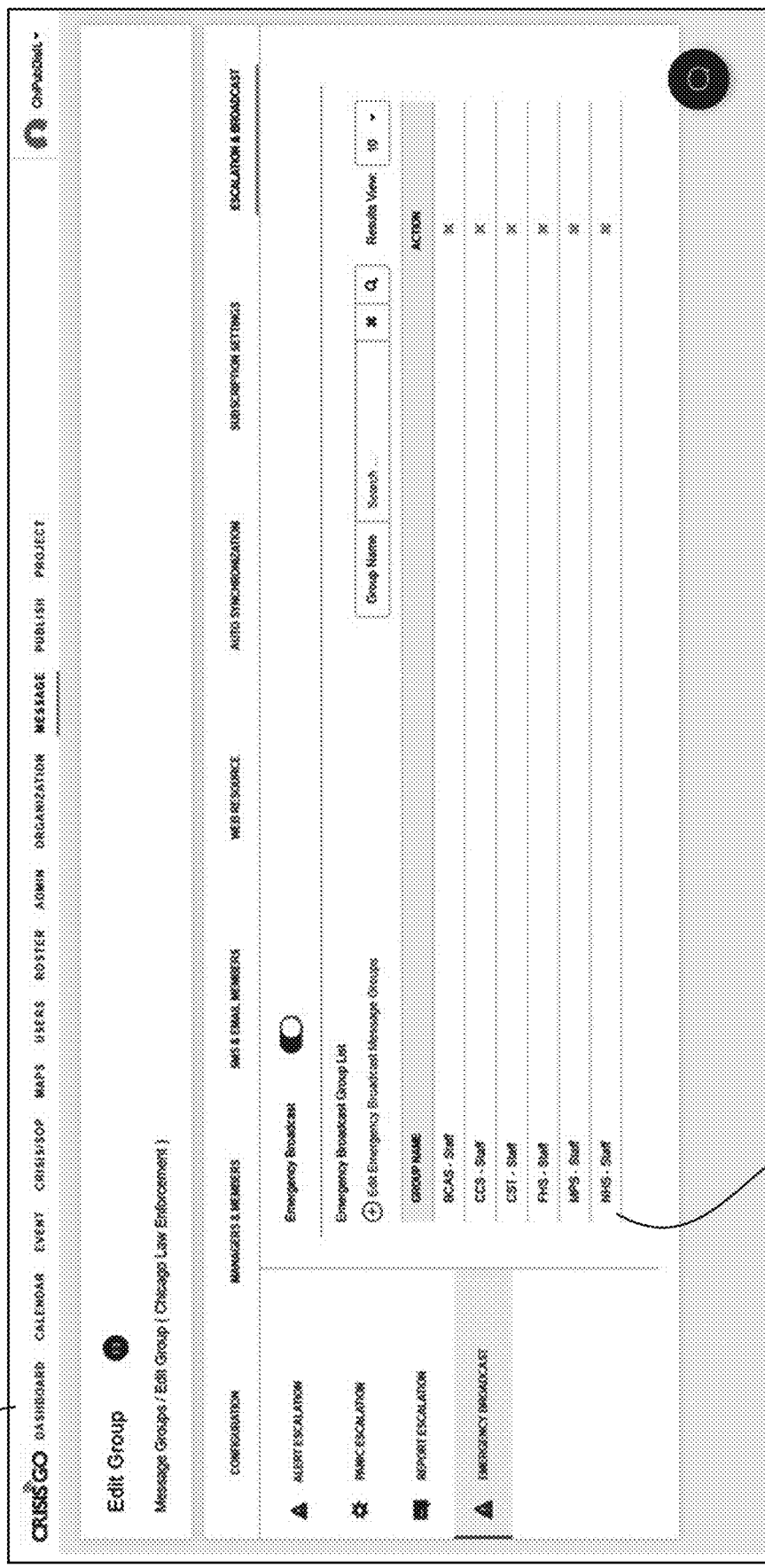
FIG. 15B illustrates a non-limiting, exemplary user interface enabling reviewing emergency communication groups to which information about an emergency event will be broadcasted according to one or more example embodiments.

FIGS. 15A-15B illustrate non-limiting, exemplary user interfaces enabling editing and reviewing emergency communication groups to which information about an emergency event will be broadcasted. The user interface 1500 in FIG. 15A includes a pop-up dialog 1510. The pop-up dialog 1510 enables a user to edit the emergency communication groups to which information about the emergency event will be broadcasted. For example, in editing these emergency communication groups, the user may add particular communication group(s) on the left section 1511 into the right section 1512 or remove communication group(s) from the right section 1512. The user interface 1520 in FIG. 15B enables the user to review the defined list of the emergency communication groups to which information about the emergency event will be broadcasted in section 1521.

Figure 15C:
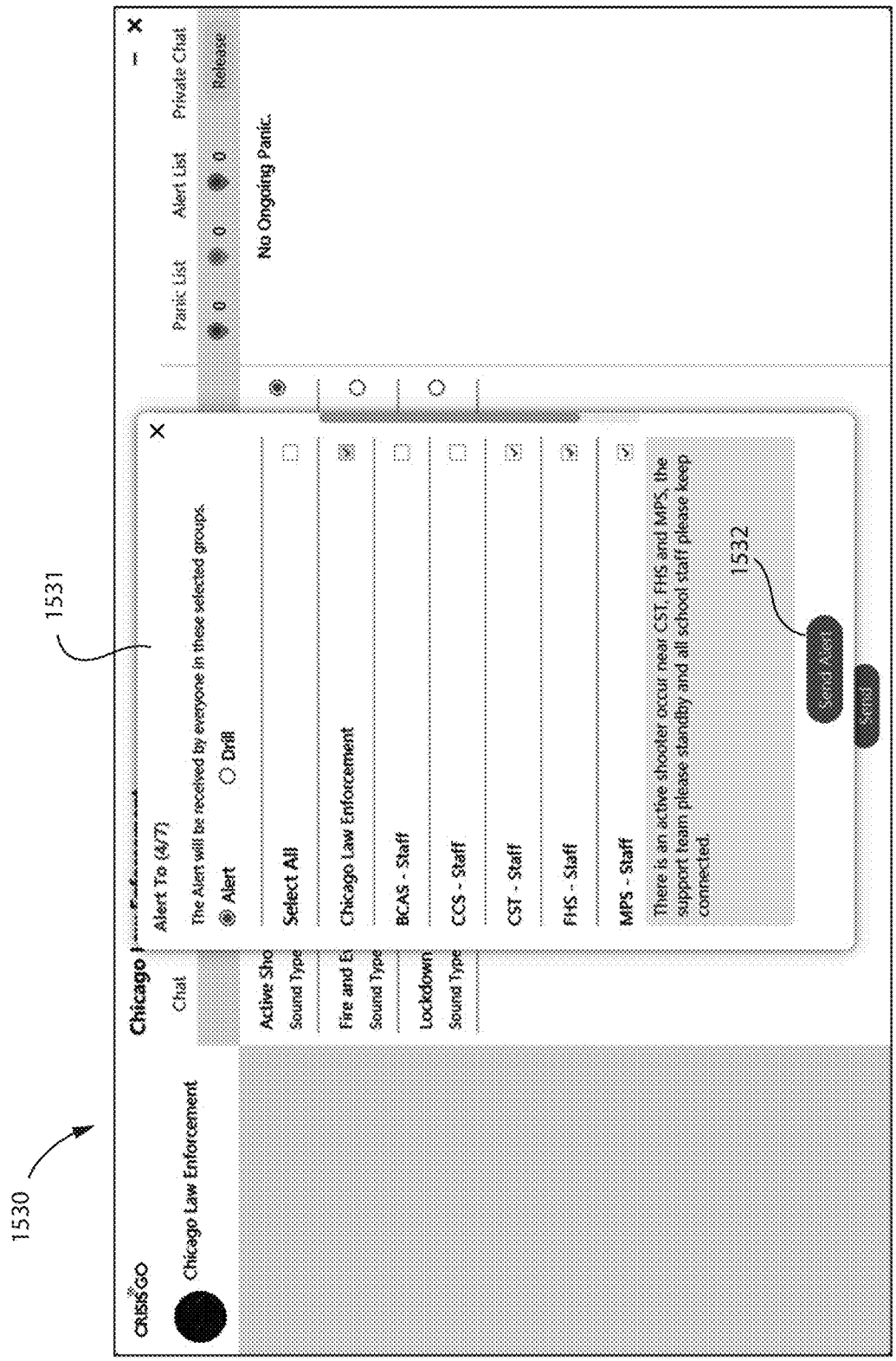
FIG. 15C illustrates a non-limiting, exemplary user interface for forwarding an example alert to selected communication group(s) according to one or more example embodiments.

In another example embodiment, after a user selects the appropriate alert type for an alert to be generated, a user interface 1530 in FIG. 15C will be generated and it enables the user to select communication group(s) to which the generated alert will be sent. As shown in FIG. 15C, the user is able to select one or more emergency communication groups displayed on a pop-up dialog 1531. For example, the user may choose to send the alert to emergency communication groups including: Chicago Law Enforcement, Chicago School for Tech (CST)-Staff, Frazier High School (FHS)-Staff and Morgan Park School (MPS)-Staff by checking the corresponding radio buttons in dialog 621.

Figure 16A:
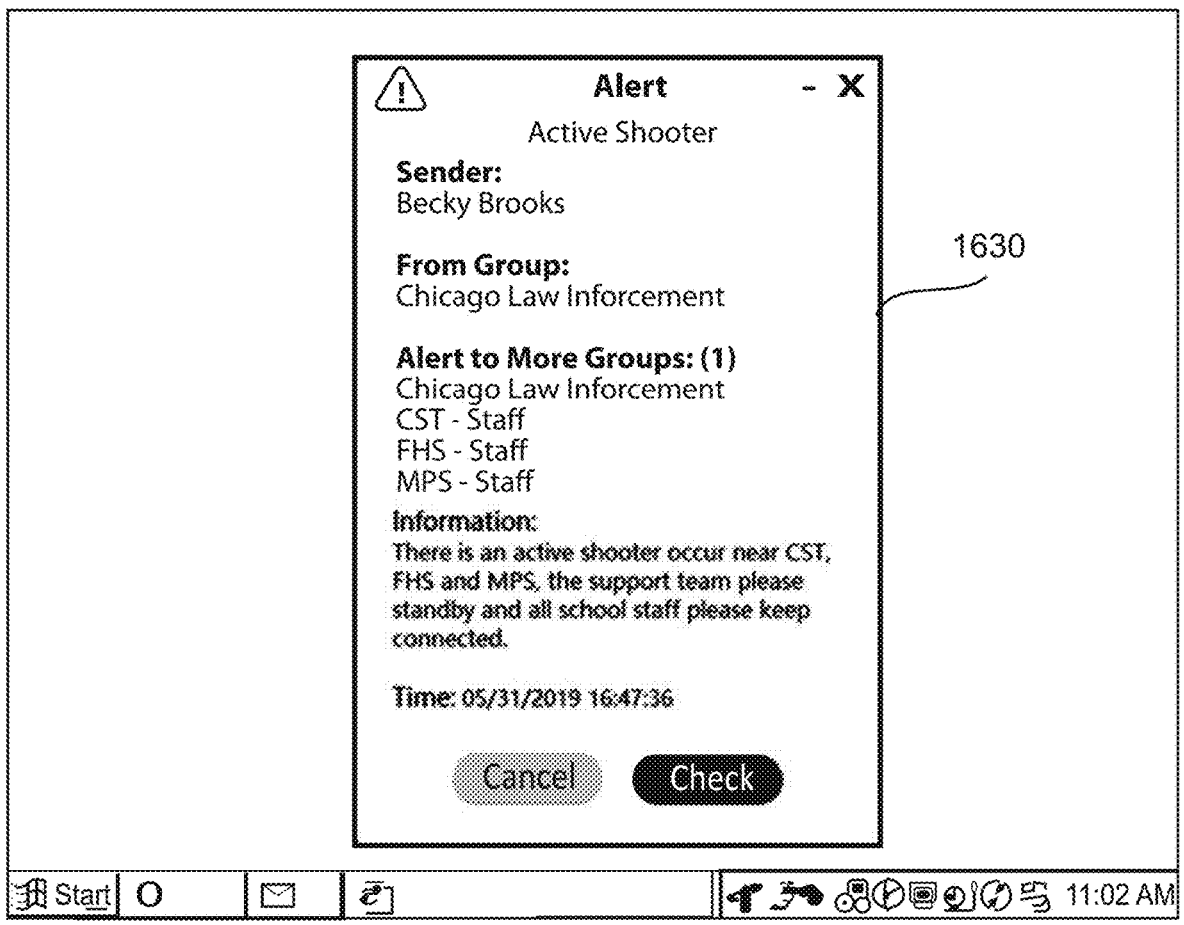
FIG. 16A illustrates a non-limiting, exemplary user interface for displaying an example alert received by a computer according to one or more example embodiments.
Figure 16B:
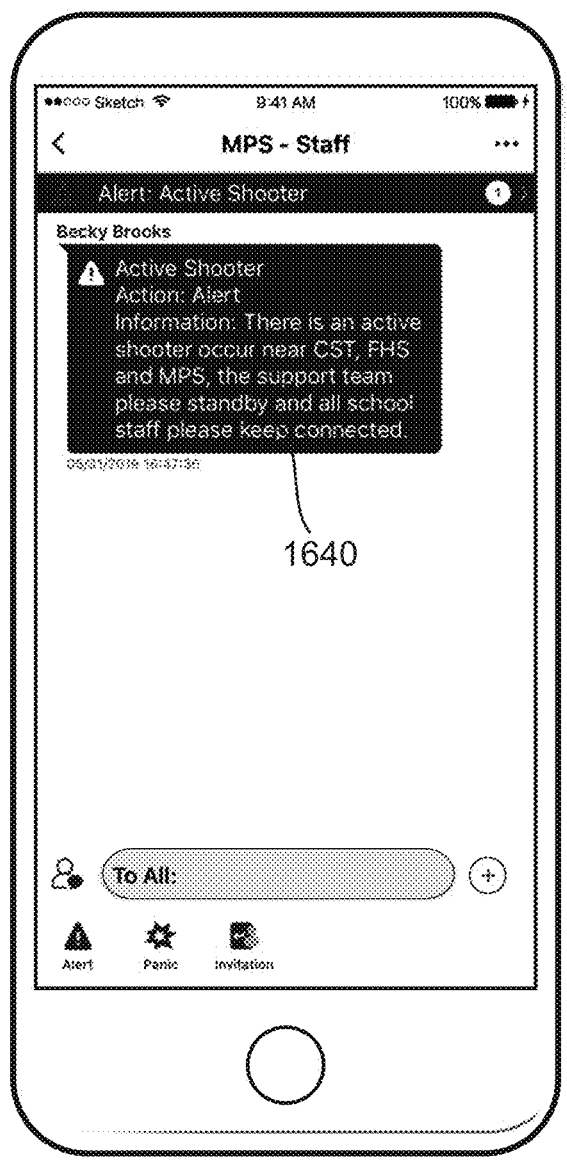
FIG. 16B illustrates a non-limiting, exemplary user interface for displaying an example alert received by a phone according to one or more example embodiments.

Once the user clicks on the "Send" icon 1532 in dialog 1531, the generated alert will be sent to all members, including both manager(s) and normal member(s), in each of the selected emergency communication groups. As shown in FIGS. 16A and 16B, the generated alert regarding an active shooter is forwarded to different kinds of electronic devices operated by members of one or more emergency communication groups. In particular, FIG. 16A shows that a dialog 1630 is popped up on the screen of a computer operated a staff member of Chicago School for Tech (CST) after the computer receives the generated alert. The dialog 1630 includes details of the alert, for example, the sender of the alert, the communication group the sender belongs to, communication groups that have received the alert (e.g., Chicago Law Enforcement, CST-staff, FHS-staff and MPS-Staff, etc.), and/or detailed information of the alert. FIG. 16B shows that an emergency message 1640 is received by a cell phone of a staff member in the Morgan Park School (MPS)-Staff Communication Group. The message 1640 indicates the type of the alert and detailed information of the active shooter event.

Figure 17:
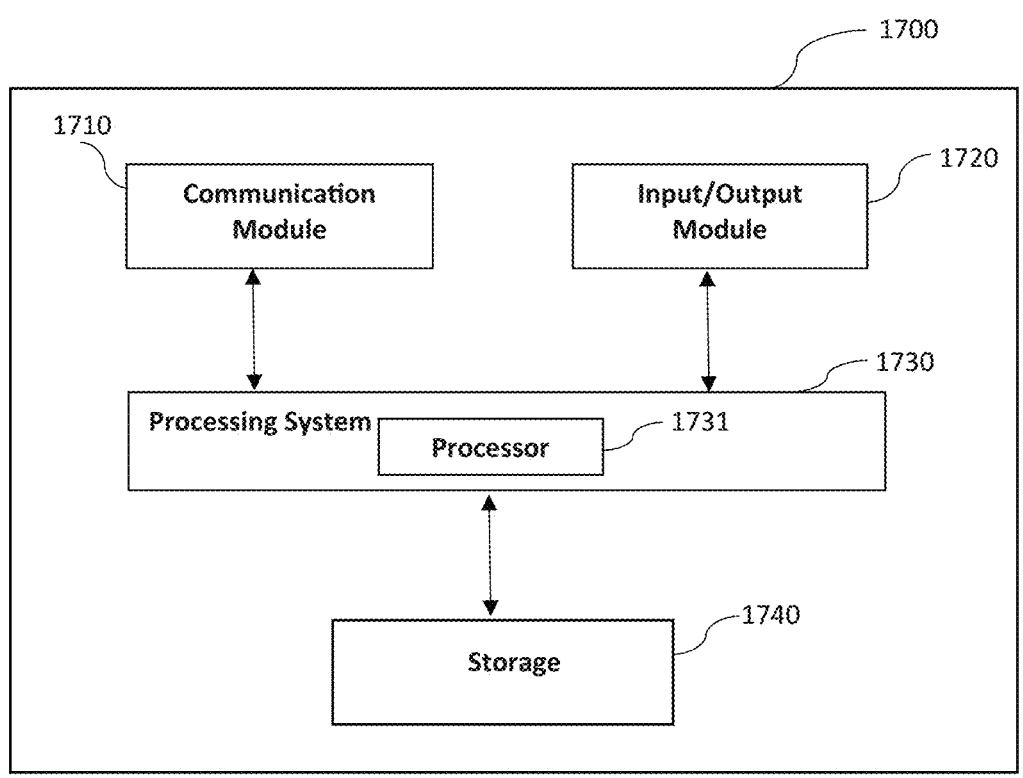
FIG. 17 illustrates a non-limiting, exemplary block diagram for an example device on which interoperable emergency communication according to one or more example embodiments.

FIG. 17 illustrates a non-limiting, example block diagram for an example device 1700. The example device 1700 may be a computer or an electronic device implementing any of the functionalities or features described above in connection with FIGS. 1-16. In this example embodiment, the device 1700 includes a communication module 1710, an input/output module 1720, a processing system 1730, and a storage 1740, all of which may be communicatively linked by a system bus, network, or other connection mechanisms.

The communication module 1710 functions to allow the device 1700 to communicate with one or more of the other devices (e.g., user devices, or servers). The communication module 1710 is configured to transmit data to other devices and/or receive data from other devices.

In certain example embodiments, the communication module 1710 may comprise one or more communication interfaces supporting satellite communications, radio communications, telephone communications, cellular communications, internet communications, and/or the like. In other example embodiments, the communication module 1710 may comprise a wireless transceiver with connected antenna, a wireless LAN module, a radio-frequency (RF), Infrared, or Bluetooth® transceiver, and/or a near field communication transceiver module. One or more of these communication components may collectively provide a communication mechanism by which the device 1700 can communicate with other devices, platform and/or networks.

The data storage 1740 may comprise one or more volatile and/or non-volatile storage components, such as, a hard disk, a magnetic disk, an optical disk, read only memory (ROM) and/or random access memory (RAM), and may include removable and/or non-removable components. The date storage 1740 may be integrated in whole or in part with the processing system 1730.

The processing system 1730 may comprise one or more processors 1731, including one or more general purpose processors and/or one or more special purpose processors (i.e., DSPs, GPUs, FPs or ASICs). The processing system 1730 may be capable of executing application program instructions (e.g., compiled or non-compiled program and/or machine code) stored in data storage 1740 to perform any of the functions and processes described above. The data storage 1740 may include non-transitory computer-readable medium, having stored thereon program instructions that, if executed by the processing system 1730, cause the device 1700 to perform any of the processes or functions disclosed herein and/or illustrated by the accompanying drawings.

In certain example embodiments, the program instructions stored in the storage 1740 may include an operating system program and one or more application programs, such as program instructions for one of the above-described modules. For example, the operations in example processes of FIGS. 4-5, 9, 12 and 14 can be defined by the program instructions stored in the storage 1740 and controlled by the processing system 1730 executing the program instructions.

The input/output module 1720 of the device 1700 may enable the device 1700 to interact with a human or non-human user, such as to receive input from a user and to provide output to the user. The input/output module 1720 may include a touch-sensitive or presence-sensitive panel, keypad, keyboard, trackball, joystick, microphone, still camera and/or video camera, and the like. The input/output module 1720 may also include one or more output components such as a display device, which may be combined with a touch-sensitive or presence-sensitive panel. In an example embodiment, the input/output module 1720 may display various user interfaces to enable a user or an operator to access services or functions provided by the device 1700.

In the example embodiments disclosed herein, although school and safety teams are used as used as examples, it is to be understood that the disclosed techniques can also be used for various industries, organizations, groups and scenarios to deal with emergency communications in various emergency situations.

The emergency or critical events disclosed herein may also be any other kinds of events that need to be efficiently communicated to various groups of people, or any events that need to be resolved through cross-organization communication and cooperation.

A "person" disclosed herein may be one person, multiple persons, one or more computer devices, one or more computer systems. The messages or notifications disclosed herein may be a multimedia message/notification comprising textual information, image(s), audio information, and/or video information, etc.

The example icons and buttons shown in the above figures are for purposes of illustration only. Any of the icons or buttons disclosed herein may be displayed on any alternative locations of a screen.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An emergency communication server for collaboration of an emergency response, comprising:
   a transceiver configured to transmit and receive data from a plurality of electronic devices,
   a storage storing information about a plurality of communication groups, each of the communication groups having a plurality of members, and
   a processing system including a processor, the processing system being configured to:

receive an input from an electronic device via the transceiver, the electronic device being operated by a member from an originating communication group, upon receipt of the input from the electronic device, generate a notification based on the received input and send the generated notification to at least one member in the originating communication group, determine one or more receiving communication groups for the received input, send the generated notification to at least one member in each of the determined one or more receiving communication groups via the transceiver, and enable the at least one member in each of the determined one or more receiving communication groups to communicate with one or more members of the originating communication group, wherein the enabling comprises adding the at least one member in each of the determined one or more receiving communication groups into the originating communication group based on both a predefined escalation option and a redefined geofencing option, the predefined geofencing option specifies a geofencing escalation list and/or a geofencing distance requirement, the geofencing distance requirement specifies a maximum distance between a current location of a member in the geofencing escalation list and a location of the electronic device transmitting the input, and the at least one member is added into the originating communication group if the at least one member is located within the maximum distance specified by the geofencing distance requirement or the at least one member is not listed in the geofencing escalation list.

2. The emergency communication server of claim 1, wherein the input from the electronic device specifies an emergency event type, and the one or more receiving communication groups being determined based on the emergency event type.

3. The emergency communication server of claim 1, wherein the plurality of members in each of the communication groups are assigned with one or more roles.

4. The emergency communication server of claim 1, wherein the one or more roles comprise a normal member, and/or a manager of the originating communication group.

5. The emergency communication server of claim 1, wherein the generated notification is an alert, a panic message or an incident report.

6. The emergency communication server of claim 1, wherein the generated notification is sent to all of the members or only members of one or more particular roles in each of the one or more receiving communication groups.

7. The emergency communication server of claim 6, wherein the generated notification is an alert, the alert being sent to all of the members in each of the one or more receiving communication groups.

8. The emergency communication server of claim 6, wherein the generated notification is a panic message, the panic message being sent to only managers in each of the one or more receiving communication groups.

9. The emergency communication server of claim 1, wherein the at least one member added into the originating communication group is assigned with one or more roles.

10. The emergency communication server of claim 1, wherein the processing system is further configured to enable members in the originating communication group to communicate with each other and/or send a message to members with specific role(s) in the originating communication group.

11. The emergency communication server of claim 1, wherein the predefined escalation options specifies one or more members from the one or more receiving communication groups to be added into the originating communication group, and/or one or more roles to be assigned to the one or more members to be added into the originating communication group.

12. The emergency communication server of claim 1, wherein information regarding the generated notification is shown on a screen of an electronic device operated by a member in one of the receiving communication groups.

13. The emergency communication server of claim 12, wherein the information regarding the generated notification is shown on the screen of the electronic device together with an audible tone.

14. The emergency communication server of claim 1, wherein the processing system is further configured to synchronize the plurality of communication groups in the storage with information provided by an external system in accordance with one or more predetermined synchronization rules.

15. The emergency communication server of claim 14, wherein the external system is an enrollment system or a human resource information system.

16. The emergency communication server of claim 14, wherein the information provided by the external system comprises characteristics of members of an organization.

17. The emergency communication server of claim 14, wherein the plurality of communication groups is automatically synchronized with the information provided by the external system periodically.

18. The emergency communication server of claim 14, wherein the information about the plurality of communication groups is synchronized with the information provided by the external system upon detecting a particular event occurred in the external system.

19. The emergency communication server of claim 18, the particular event is adding, removing or updating a person in the external system.

20. A method of controlling a server including a processing system, the method comprising:

receiving an input from an electronic device, the electronic device being operated by a member from an originating communication group, upon receipt of the input from the electronic device, generating a notification based on the received input and sending the generated notification to at least one member in the originating communication group, determining one or more receiving communication groups for the received input, sending the generated notification to at least one member in each of the determined one or more receiving communication groups, and enabling the at least one member in each of the determined one or more receiving communication groups to communicate with one or more members of the originating communication group, wherein the enabling comprises adding the at least one member in each of the determined one or more receiving communication groups into the originating communication group based on both a predefined escalation option and a predefined geofencing option, the predefined geofencing option specifies a geofencing escalation list and/or a geofencing distance requirement, the geofencing distance requirement specifies a maximum distance between a current location of a member in the geofencing escalation list and a location of the electronic device transmitting the input, and the at least one member is added into the originating communication group if the at least one member is located within the maximum distance specified by the geofencing distance requirement or the at least one member is not listed in the geofencing escalation list.

21. A non-transitory computer-readable storage medium having stored therein an information processing program for execution by a device comprising a processing system including a processor, the information processing program comprising instructions that, when executed by the processing system, causing the device to perform operations including:

receiving an input from an electronic device, the electronic device being operated by a member from an originating communication group, upon receipt of the input from the electronic device, generating a notification based on the received input and sending the generated notification to at least one member in the originating communication group, determining one or more receiving communication groups for the received input, sending the generated notification to at least one member in each of the determined one or more receiving communication groups, and enabling the at least one member in each of the determined one or more receiving communication groups to communicate with one or more members of the originating communication group, wherein the enabling comprises adding the at least one member in each of the determined one or more receiving communication groups into the originating communication group based on both a predefined escalation option and a predefined geofencing option, the predefined geofencing option specifies a geofencing escalation list and/or a geofencing distance requirement, the geofencing distance requirement specifies a maximum distance between a current location of a member in the geofencing escalation list and a location of the electronic device transmitting the input, and the at least one member is added into the originating communication group if the at least one member is located within the maximum distance specified by the geofencing distance requirement or the at least one member is not listed in the geofencing escalation list.

22. An emergency communication system for collaboration of an emergency response, the system comprising:

the emergency communication server according to claim 1; and an electronic device including:
- a processor configured to generate a user interface enabling a user to input data,
- a transmitter configured to transmit inputs to the server, the inputs being generated based on the data input by the user, and
- a receiver configured to receive a message or notification from the server.

* * * * *